US012381689B2

(12) United States Patent
Li et al.

(10) Patent No.: US 12,381,689 B2
(45) Date of Patent: Aug. 5, 2025

(54) INTERLACED FEEDBACK FOR SIDELINK COMMUNICATIONS VIA UNLICENSED CHANNELS

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US); Shuanshuan Wu, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 17/855,728

(22) Filed: Jun. 30, 2022

(65) Prior Publication Data

US 2024/0007254 A1    Jan. 4, 2024

(51) Int. Cl.
*H04W 4/00* (2018.01)
*H04L 5/00* (2006.01)
*H04W 16/14* (2009.01)
*H04W 92/18* (2009.01)

(52) U.S. Cl.
CPC .......... *H04L 5/0053* (2013.01); *H04W 16/14* (2013.01); *H04W 92/18* (2013.01)

(58) Field of Classification Search
CPC ... H04L 5/0053; H04L 5/0091; H04L 5/0055; H04W 16/14; H04W 92/18
See application file for complete search history.

(56) References Cited

U.S. PATENT DOCUMENTS

| | | | | |
|---|---|---|---|---|
| 2018/0213379 A1* | 7/2018 | Xiong | ..................... | H04W 4/70 |
| 2021/0105126 A1* | 4/2021 | Yi | ......................... | H04L 1/1671 |
| 2021/0195610 A1* | 6/2021 | Wang | ..................... | H04L 1/1854 |
| 2022/0123905 A1* | 4/2022 | Lu | ............................. | H04L 1/18 |
| 2022/0248428 A1* | 8/2022 | Zhao | ................. | H04W 72/1263 |

(Continued)

FOREIGN PATENT DOCUMENTS

| | | |
|---|---|---|
| EP | 4156811 A1 | 3/2023 |
| WO | WO-2021189428 A1 | 9/2021 |

(Continued)

OTHER PUBLICATIONS

International Search Report and Written Opinion—PCT/US2023/068409—ISA/EPO—Sep. 19, 2023.

(Continued)

*Primary Examiner* — Stephen M D Agosta
(74) *Attorney, Agent, or Firm* — Holland & Hart LLP

(57) ABSTRACT

Methods, systems, and devices for wireless communications are described. Multiple transmitting user equipments (UEs) may send sidelink data transmissions. Receiving sidelink UEs may map sidelink feedback interlaces corresponding to detected sidelink data transmissions to sidelink feedback resources of a common sidelink feedback symbol according to an interlace mapping rule (e.g., defining which contiguous or non-contiguous frequency resources the UE is to use for transmitting sidelink feedback for the received sidelink data messages). The receiving UEs may map one or more replicas of initial interlaces of sidelink feedback resources to additional available resources of the sidelink feedback resources in the common feedback symbol.

26 Claims, 17 Drawing Sheets

(56) References Cited

U.S. PATENT DOCUMENTS

| | | | | |
|---|---|---|---|---|
| 2022/0248434 A1* | 8/2022 | Zhao | ................. | H04W 72/1268 |
| 2022/0264536 A1* | 8/2022 | Lin | ..................... | H04L 5/0055 |
| 2022/0286255 A1* | 9/2022 | Guo | ..................... | H04L 5/006 |
| 2022/0386325 A1* | 12/2022 | Zhao | .................... | H04L 1/1893 |
| 2023/0008375 A1* | 1/2023 | Sun | ..................... | H04W 72/23 |
| 2023/0036504 A1* | 2/2023 | Sun | ..................... | H04L 1/1825 |
| 2023/0040257 A1* | 2/2023 | Yoshioka | ............ | H04W 72/569 |
| 2023/0041458 A1* | 2/2023 | Zhao | .................... | H04W 72/25 |
| 2023/0063901 A1* | 3/2023 | Zhao | .................... | H04L 1/1887 |
| 2023/0069882 A1* | 3/2023 | Zhao | .................... | H04L 5/0094 |
| 2023/0136864 A1* | 5/2023 | Lei | ...................... | H04L 5/0055 |
| | | | | 370/329 |
| 2023/0146718 A1* | 5/2023 | Lei | ...................... | H04L 1/1607 |
| | | | | 370/329 |
| 2023/0156784 A1* | 5/2023 | Liu | ..................... | H04W 72/20 |
| | | | | 370/252 |
| 2023/0164813 A1* | 5/2023 | Guo | .................. | H04W 52/0212 |
| | | | | 370/311 |
| 2023/0171792 A1* | 6/2023 | Sun | ..................... | H04W 72/02 |
| | | | | 370/329 |
| 2023/0224959 A1* | 7/2023 | Wu | .................. | H04W 74/0808 |
| | | | | 370/329 |
| 2023/0232375 A1* | 7/2023 | Zhao | .................... | H04W 72/25 |
| | | | | 370/329 |
| 2023/0247528 A1* | 8/2023 | Liu | ....................... | H04W 48/08 |
| | | | | 370/329 |
| 2023/0292345 A1* | 9/2023 | Lei | ........................ | H04L 1/1614 |
| 2023/0309117 A1* | 9/2023 | Sun | ...................... | H04L 5/0055 |
| 2023/0319745 A1* | 10/2023 | Liu | ................... | H04W 72/1263 |
| | | | | 370/503 |
| 2023/0354311 A1* | 11/2023 | Xue | ..................... | H04L 1/1822 |
| 2023/0370204 A1* | 11/2023 | Yoshioka | .............. | H04L 1/1887 |
| 2023/0379939 A1* | 11/2023 | Lei | ........................ | H04W 72/25 |
| 2024/0049264 A1* | 2/2024 | Zhao | ................. | H04W 72/0453 |

FOREIGN PATENT DOCUMENTS

| | | |
|---|---|---|
| WO | WO-2021232382 A1 | 11/2021 |
| WO | WO-2023032230 A1 | 3/2023 |

OTHER PUBLICATIONS

Nokia, et al., "On Physical Channel Design Framework for SL-U", 3GPP TSG RAN WG1 #113, R1-2304342, 3rd Generation Partnership Project, Mobile Competence Centre, 650, Route Des Lucioles, F-06921 Sophia-Antipolis Cedex, France, vol. RAN WG1, No. Incheon, Korea, May 22, 2023-May 26, 2023, May 15, 2023, XP052384946, 21 pages.

* cited by examiner

INTERLACED FEEDBACK FOR SIDELINK COMMUNICATIONS VIA UNLICENSED CHANNELS

FIELD OF TECHNOLOGY

The following relates to wireless communications, including interlaced feedback for sidelink communications via unlicensed resources.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support interlaced feedback for sidelink communications via unlicensed resources. For example, multiple transmitting user equipments (UEs) may send sidelink data transmissions. Receiving sidelink UEs may map sidelink feedback interlaces corresponding to detected sidelink data transmissions to sidelink feedback resources of a common sidelink feedback symbol according to an interlace mapping rule (e.g., defining which contiguous or non-contiguous frequency resources the UE is to use for transmitting sidelink feedback for the received sidelink data messages). The receiving UEs may map one or more replicas (e.g., additional interlaces) of initial sidelink feedback interlaces to additional available resources of the sidelink feedback resources in the common feedback symbol. For example, the receiving sidelink UE may determine that one or more physical resource blocks (PRBs) in the common feedback symbol are available (e.g., the sidelink feedback resources are unoccupied by initial interlaces of sidelink resources for the UE or any other sidelink UEs responsive to received sidelink data transmissions), and may transmit the one or more sidelink feedback messages in both the initial interlace and the replica interlaces (at unoccupied sidelink feedback resources). Transmissions of sidelink feedback messages on both initial interlaces and replica interlaces may result in sidelink feedback signaling that does not result in interference, but also satisfies the channel occupancy threshold condition.

A method for wireless communication at a UE is described. The method may include detecting one or more sidelink messages on an unlicensed channel, the one or more sidelink messages sharing a common sidelink feedback symbol, mapping a first set of sidelink feedback resources for a first interlace of one or more interlaces for each sidelink feedback associated with the one or more sidelink messages according to an interlace mapping rule associated with sidelink feedback resources of the common sidelink feedback symbol, determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE, and transmitting, during the sidelink feedback symbol, sidelink feedback associated with the first sidelink message via the first interlace according to the mapping and based at least in part on the determining.

An apparatus for wireless communication is described. The apparatus may include a processor, memory coupled with the processor, and instructions stored in the memory. The instructions may be executable by the processor to cause the apparatus to detect one or more sidelink messages on an unlicensed channel, the one or more sidelink messages sharing a common sidelink feedback symbol, map a first set of sidelink feedback resources for a first interlace of one or more interlaces for each sidelink feedback associated with the one or more sidelink messages according to an interlace mapping rule associated with sidelink feedback resources of the common sidelink feedback symbol, determine whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE, and transmit, during the sidelink feedback symbol, sidelink feedback associated with the first sidelink message via the first interlace according to the mapping and based at least in part on the determining.

Another apparatus for wireless communication at a UE is described. The apparatus may include means for detecting one or more sidelink messages on an unlicensed channel, the one or more sidelink messages sharing a common sidelink feedback symbol, means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol, means for determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE, and means for transmitting, during the sidelink feedback symbol, sidelink feedback associated with the first sidelink message via the first interlace according to the mapping and based at least in part on the determining.

A non-transitory computer-readable medium storing code for wireless communication at a UE is described. The code may include instructions executable by a processor to detect one or more sidelink messages on an unlicensed channel, the one or more sidelink messages sharing a common sidelink feedback symbol, map a first set of sidelink feedback resources for a first interlace of one or more interlaces for each sidelink feedback associated with the one or more sidelink messages according to an interlace mapping rule associated with sidelink feedback resources of the common sidelink feedback symbol, determine whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE, and transmit, during the sidelink feedback symbol, sidelink feedback associated with the first sidelink message via the first interlace according to the mapping and based at least in part on the determining.

Some examples of the method, apparatuses, and non-transitory computer-readable medium described herein may further include operations, features, means, or instructions for transmitting, during the sidelink feedback symbol, the sidelink feedback associated with the first sidelink message via the replica of the first interlace based at least in part on the determining, wherein the replica of the first interlace for the sidelink feedback associated with the first sidelink message is not overlapping with the additional first interlace for the sidelink feedback associated with the second sidelink message.

Some examples of the method, apparatuses, and non-transitory computer-readable medium described herein may further include operations, features, means, or instructions for mapping the replica of the first interlace for the sidelink feedback associated with the first sidelink message to a second set of sidelink feedback resources of the sidelink feedback symbol according to a replica mapping rule, wherein the determining is based at least in part on the mapping.

In some examples of the method, apparatuses, and non-transitory computer-readable medium described herein, the replica mapping rule comprises an offset value indicating a quantity of frequency resources of the sidelink feedback symbol between the first set of sidelink feedback resources and the second set of sidelink feedback resources of the sidelink feedback symbol.

In some examples of the method, apparatuses, and non-transitory computer-readable medium described herein, the first interlace and the replica of the first interlace for the sidelink feedback associated with the first sidelink message satisfy a channel occupancy threshold for the sidelink feedback symbol on the unlicensed channel.

Some examples of the method, apparatuses, and non-transitory computer-readable medium described herein may further include operations, features, means, or instructions for refraining from transmitting the replica of the first interlace for the sidelink feedback associated with the first sidelink message via the second set of sidelink feedback resources of the sidelink feedback symbol based at least in part on the determining, wherein the second set of sidelink feedback resources of the sidelink feedback symbol is occupied by the additional first interlace for the sidelink feedback associated with the second sidelink message.

In some examples of the method, apparatuses, and non-transitory computer-readable medium described herein, the sidelink feedback satisfies a channel occupancy threshold for the sidelink feedback symbol on the unlicensed channel.

Some examples of the method, apparatuses, and non-transitory computer-readable medium described herein may further include operations, features, means, or instructions for receiving configuration information comprising parameters for at least the interlace mapping rule, a replica mapping rule, or both, wherein the mapping is based at least in part on the parameters.

Some examples of the method, apparatuses, and non-transitory computer-readable medium described herein may further include operations, features, means, or instructions for monitoring the unlicensed channel for the one or more sidelink messages, wherein the detecting is based at least in part on the monitoring, and wherein at least one of the one or more sidelink messages are addressed to one or more additional UEs.

In some examples of the method, apparatuses, and non-transitory computer-readable medium described herein, the mapping is based at least in part on the interlace mapping rule and a cast type of the first sidelink message.

In some examples of the method, apparatuses, and non-transitory computer-readable medium described herein, transmitting the sidelink feedback includes transmitting a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a unicast cast type addressed to the UE.

In some examples of the method, apparatuses, and non-transitory computer-readable medium described herein, transmitting the sidelink feedback includes transmitting a sidelink feedback message associated with the first sidelink message via a first set of a plurality of physical resource blocks for the first interlace for sidelink feedback, the sidelink feedback message comprising a negative acknowledgement message indicating that the UE failed to decode the first sidelink message, wherein the first sidelink message comprises a multicast cast type addressed to a plurality of UEs comprising the UE, and wherein the first set of the plurality of physical resource block is allocated to the plurality of UEs, according to the interlace mapping rule, for transmitting the sidelink feedback.

In some examples of the method, apparatuses, and non-transitory computer-readable medium described herein, transmitting the sidelink feedback includes transmitting a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a multicast cast type addressed to a plurality of UEs comprising the UE, and wherein the first set of the plurality of physical resource blocks of the first interlace is allocated to each UE of the plurality of UEs, according to the interlace mapping rule, for transmitting the sidelink feedback.

In some examples of the method, apparatuses, and non-transitory computer-readable medium described herein, the first interlace for sidelink feedback comprises a plurality of physical resource blocks that are contiguous in frequency. In some examples of the method, apparatuses, and non-transitory computer-readable medium described herein, the first interlace for sidelink feedback comprises a plurality of physical resource blocks that are not contiguous in frequency. In some examples of the method, apparatuses, and non-transitory computer-readable medium described herein, the first interlace for sidelink feedback comprises a plurality of respective physical resource blocks that are associated with a single cyclic shift. In some examples of the method, apparatuses, and non-transitory computer-readable medium described herein, the first interlace for sidelink feedback comprises a plurality of respective physical resource blocks that are associated with a plurality of cyclic shifts.

A method for wireless communication at a UE is described. The method may include transmitting one or more sidelink messages on an unlicensed channel, the one or more sidelink messages sharing a common sidelink feedback symbol, mapping a first set of sidelink feedback resources for a first interlace of one or more interlaces for each sidelink feedback associated with the one or more sidelink messages according to an interlace mapping rule associated with sidelink feedback resources of the common sidelink feedback symbol, and receiving, during the sidelink feedback symbol, a sidelink feedback associated with a first sidelink message of the one or more sidelink messages via the first interlace according to the mapping.

An apparatus for wireless communication is described. The apparatus may include a processor, memory coupled with the processor, and instructions stored in the memory. The instructions may be executable by the processor to cause the apparatus to transmit one or more sidelink messages on an unlicensed channel, the one or more sidelink messages sharing a common sidelink feedback symbol, map a first set of sidelink feedback resources for a first interlace of one or more interlaces for each sidelink feedback associated with the one or more sidelink messages according to an interlace mapping rule associated with sidelink feedback resources of the common sidelink feedback symbol, and receive, during the sidelink feedback symbol, a sidelink feedback associated with a first sidelink message of the one or more sidelink messages via the first interlace according to the mapping.

Another apparatus for wireless communication at a UE is described. The apparatus may include means for transmitting one or more sidelink messages on an unlicensed channel, the one or more sidelink messages sharing a common sidelink feedback symbol, means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol, and means for receiving, during the sidelink feedback symbol, a sidelink feedback associated with a first sidelink message of the one or more sidelink messages via the first interlace according to the mapping.

A non-transitory computer-readable medium storing code for wireless communication at a UE is described. The code may include instructions executable by a processor to transmit one or more sidelink messages on an unlicensed channel, the one or more sidelink messages sharing a common sidelink feedback symbol, map a first set of sidelink feedback resources for a first interlace of one or more interlaces for each sidelink feedback associated with the one or more sidelink messages according to an interlace mapping rule associated with sidelink feedback resources of the common sidelink feedback symbol, and receive, during the sidelink feedback symbol, a sidelink feedback associated with a first sidelink message of the one or more sidelink messages via the first interlace according to the mapping.

Some examples of the method, apparatuses, and non-transitory computer-readable medium described herein may further include operations, features, means, or instructions for receiving configuration information comprising parameters for at least the interlace mapping rule, a replica mapping rule, or both, wherein the mapping is based at least in part on the parameters.

Some examples of the method, apparatuses, and non-transitory computer-readable medium described herein may further include operations, features, means, or instructions for mapping the first set of sidelink feedback resources for the first interlace for each sidelink feedback associated with the one or more sidelink messages based at least in part on the interlace mapping rule and a cast type of the first sidelink message, and monitoring the first interlace for each sidelink feedback associated with the one or more sidelink messages based at least in part on the mapping, wherein receiving the sidelink feedback associated with the first sidelink message is based at least in part on the monitoring.

In some examples of the method, apparatuses, and non-transitory computer-readable medium described herein, receiving the sidelink feedback includes receiving a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a unicast cast type.

In some examples of the method, apparatuses, and non-transitory computer-readable medium described herein, receiving the sidelink feedback includes receiving at least one sidelink feedback message associated with the first sidelink message via a first set of a plurality of physical resource blocks for the first interlace for sidelink feedback, the sidelink feedback message comprising a negative acknowledgement message indicating that at least one of a plurality of UEs failed to decode the first sidelink message, wherein the first sidelink message comprises a multicast cast type addressed to the plurality of UEs, and wherein the first set of the physical resource block is allocated to the plurality of UEs, according to the interlace mapping rule, for transmitting the sidelink feedback.

In some examples of the method, apparatuses, and non-transitory computer-readable medium described herein, receiving the sidelink feedback includes receiving a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a multicast cast type addressed to a plurality of UEs, and wherein the first set of the plurality of physical resource blocks are allocated to a respective UE of the plurality of UEs, according to the interlace mapping rule, for transmitting the sidelink feedback.

In some examples of the method, apparatuses, and non-transitory computer-readable medium described herein, the first interlace for sidelink feedback comprises a plurality of physical resource blocks that are contiguous in frequency. In some examples of the method, apparatuses, and non-transitory computer-readable medium described herein, the first interlace for sidelink feedback comprises a plurality of physical resource blocks that are not contiguous in frequency. In some examples of the method, apparatuses, and non-transitory computer-readable medium described herein, the first interlace for sidelink feedback comprises a plurality of respective physical resource blocks that are associated with a single cyclic shift. In some examples of the method, apparatuses, and non-transitory computer-readable medium described herein, the first interlace for sidelink feedback comprises a plurality of respective physical resource blocks that are associated with a plurality of cyclic shifts.

DETAILED DESCRIPTION

Figure 1:
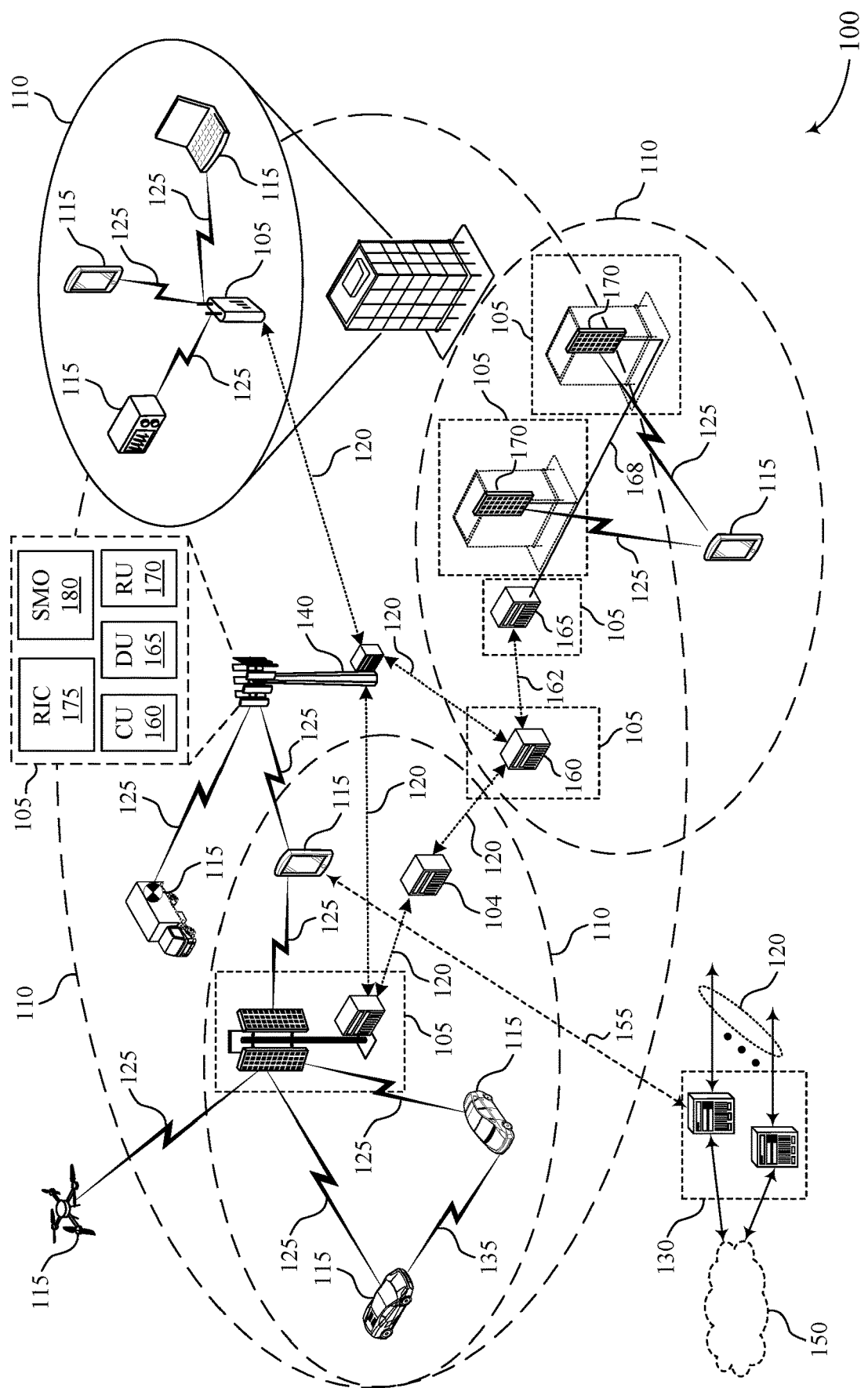
FIG. 1 illustrates an example of a wireless communications system that supports interlaced feedback for sidelink communications via unlicensed channels in accordance with one or more aspects of the present disclosure.

Wireless communications systems may support sidelink communications between user equipments (UEs). Sidelink UEs may communicate with each other via sidelink channels (e.g., physical sidelink shared channel (PSSCH)). Sidelink UEs may communicate feedback signaling (e.g., acknowl- edgement (ACK) messages or negative acknowledgement (NACK) messages) on a feedback symbol (e.g., a physical sidelink feedback channel (PSFCH)). A receiving sidelink UE may map feedback signaling to PSFCH resources based on one or more mapping rules. A number and location of PSFCH resources may depend on a number of sidelink transmissions (e.g., how many transmitting UEs occupy time and frequency resources of a PSSCH), or a cast type of transmission (e.g., a cast type). For example, a feedback message for a unicast message or some types of groupcast messages (e.g., NACK-only feedback messages) may occupy a small number of resources (e.g., a single physical resource block (PRB) in a PSFCH symbol), while feedback messages for other groupcast messages (e.g., ACK or NACK feedback messages) may occupy a larger number of resources (e.g., one PRB for each UE of the groupcast message).

In some wireless communications systems, sidelink UEs may perform sidelink communications on unlicensed frequency resources (e.g., a 20 MHz listen-before-talk (LBT) channel). Such channels may be subject to an occupied channel bandwidth (OCB) condition. Under such conditions, sidelink data transmissions, sidelink feedback transmissions, or both, may be supported if such signaling satisfies a threshold amount of a nominal channel bandwidth. However, a number of feedback messages transmitted during a PSFCH symbol within an LBT subchannel may vary dynamically based on a number of PSSCH transmissions, as well as based on a cast type of sidelink transmission. Therefore, a fixed interlacing pattern of sidelink data transmissions, or a limited mapping pattern for transmitting sidelink feedback messages, may not result in feedback transmissions that satisfy the OCB condition.

Wireless communications systems may support an adaptive interlacing scheme for sidelink transmissions and feedback signaling, resulting in sidelink feedback signaling on a PSFCH that satisfies the OCB condition regardless of a number or cast type of sidelink transmissions corresponding to the feedback signaling. Such an adaptive interlacing scheme may support mapping of sidelink resources to interlaces of sidelink feedback resources, and then replication of the interlaces across the PSFCH, such that the OCB condition is met. Multiple transmitting UEs may send sidelink data transmissions on various sidelink resources (e.g., PRBs or subchannels) on a PSSCH of an unlicensed channel (e.g., a 20 MHz LBT channel).

Receiving sidelink UEs may detect all transmitted sidelink messages (e.g., may decode sidelink control information associated with each transmitted sidelink message), and may map sidelink feedback resources of the corresponding PSFCH to individual interlaces of sidelink feedback resources according to an interlace mapping rule (e.g., defining which contiguous or non-contiguous PRBs the UE is to use for transmitting sidelink feedback for the received PSSCH messages). An interlace of one or more PRBs on which the UE is to transmit sidelink feedback according to the interlace mapping rule may be referred to as an initial interlace (e.g., a first interlace). The receiving UEs may map one or more replicas (e.g., additional interlaces) of initial interlaces to additional available sidelink feedback resources on the PSFCH (e.g., may replicate the sidelink feedback messages and map them to additional resources on the PSFCH). For example, the receiving sidelink UE may determine that one or more PRBs in the PSFCH symbol are available (e.g., the PSFCH symbols are unoccupied by initial sidelink feedback messages in initial interlaces from the UE or any other sidelink UEs responsive to received sidelink data transmissions) based on the interlace mapping rule, and may transmit a replica of one or more initial interlaces (e.g., may transmit a replica of the sidelink message via the additional sidelink feedback resources elsewhere in the PSFCH) in the unoccupied PRBs. If sidelink feedback resources are occupied (e.g., if sidelink feedback resources are occupied by an initial interlace for the UE or for another UE), then the UE may refrain from replicating sidelink feedback messages. This may result in receiving UEs transmitting feedback signaling in the PSFCH (e.g., initial interlaces, replica interlaces, or a combination thereof) sufficient to satisfy the OCB condition.

The adaptive scheme described herein may support mapping of sidelink feedback resources for transmitting sidelink feedback and then replication of the feedback message across different interlaces of the mapping such that the OCB condition is met. Multiple transmitting UEs may send sidelink data transmissions on various PRBs. Receiving sidelink UEs may map sidelink feedback interlaces corresponding to detected sidelink data transmissions to PSFCH resources according to an interlace mapping rule (e.g., defining which contiguous or non-contiguous PRBs the UE is to use for transmitting sidelink feedback for the received PSSCH messages). The receiving UEs may map one or more replicas (e.g., additional interlaces) of initial interlaces of sidelink feedback resources to additional available interlaces of the sidelink feedback resources on the PSFCH. For example, the receiving sidelink UE may determine that one or more PRBs in the PSFCH symbol are available (e.g., the PSFCH resources are unoccupied by initial interlaces of sidelink resources for the UE or any other sidelink UEs responsive to received sidelink data transmissions), and may transmit the one or more sidelink feedback messages in both the initial interlace for sidelink feedback and the unoccupied replica interlaces (e.g., unoccupied PRBs). Transmissions of sidelink feedback on both initial interlaces and replica interlaces of sidelink feedback resources may result in sidelink feedback signaling that does not result in interference, but also satisfies the channel occupancy threshold condition.

Aspects of the disclosure are initially described in the context of wireless communications systems. Aspects of the disclosure are further illustrated by and described with reference to wireless communications systems, sidelink interlace feedback schemes, and process flows. Aspects of the disclosure are further illustrated by and described with reference to apparatus diagrams, system diagrams, and flowcharts that relate to interlaced feedback for sidelink communications via unlicensed resources.

FIG. 1 illustrates an example of a wireless communications system 100 that supports interlaced feedback for sidelink communications via unlicensed channels in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support interlaced feedback for sidelink communications via unlicensed channels as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Multiple transmitting UEs 115 may send sidelink data transmissions on various PRBs. Receiving sidelink UEs 115 may map sidelink feedback interlaces corresponding to detected sidelink data transmissions to PSFCH resources according to an interlace mapping rule (e.g., defining which contiguous or non-contiguous PRBs the UE 115 is to use for transmitting sidelink feedback for the received PSSCH messages). The receiving UEs 115 may map one or more replicas (e.g., additional interlaces) of initial interlaces of sidelink feedback resources to additional available interlaces of the sidelink feedback resources on the PSFCH. For example, the receiving sidelink UE 115 may determine that one or more PRBs in the PSFCH symbol are available (e.g., the PSFCH resources are unoccupied by initial interlaces of sidelink resources for the UE 115 or any other sidelink UEs responsive to received sidelink data transmissions), and may transmit the one or more sidelink feedback messages in both the initial interlace for sidelink feedback and the unoccupied replica interlaces (e.g., unoccupied PRBs). Transmissions of sidelink feedback on both initial interlaces and replica interlaces of sidelink feedback resources may result in sidelink feedback signaling that does not result in interference, but also satisfies the channel occupancy threshold condition.

Figure 2:
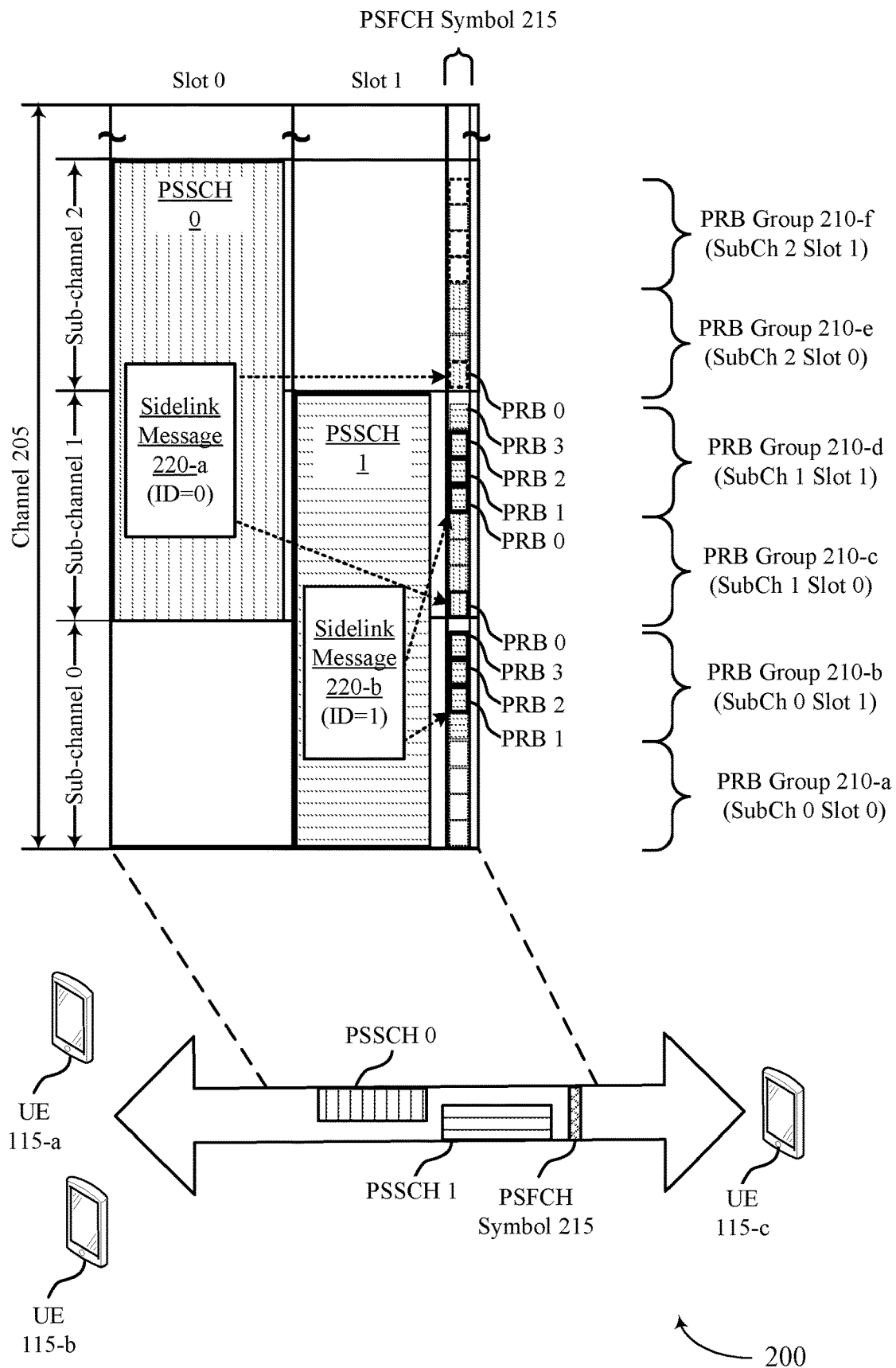
FIG. 2 illustrates an example of a wireless communications system that supports interlaced feedback for sidelink communications via unlicensed channels in accordance with one or more aspects of the present disclosure.

FIG. 2 illustrates an example of a wireless communications system 200 that supports interlaced feedback for sidelink communications via unlicensed channels in accordance with one or more aspects of the present disclosure. Wireless communications system 200 may implement, or be implemented by, aspects of wireless communications system 100. For example, wireless communications system 200 may include one or more UEs 115 (e.g., the UE 115-a, the UE 115-b, and the UE 115-c), and one or more network entities (e.g., a network entity 105), which may be examples of corresponding devices described with reference to FIG. 1.

The UE 115-a, the UE 115-b, and the UE 115-c may perform sidelink communications with each other using one or more sidelink channels. For example, one or more transmitting UEs 115 (e.g., the UE 115-a, the UE 115-b, or both), may transmit sidelink data using one or more PSSCHs (e.g., PSSCH 0 and PSSCH 1) to one or more receiving UEs 115 (e.g., the UE 115-c). The UE 115-c may receive unicast sidelink messages, groupcast sidelink messages, or any combination thereof. The sidelink messages may correspond to a feedback symbol (e.g., PSFCH symbol 215) on which the receiving UE 115-c is to transmit sidelink feedback for received sidelink messages.

A feedback symbol (e.g., the PSFCH symbol 215) may be multiplexed in a frequency domain, a code domain, or both. For example, the feedback symbol may be divided into frequency resources (e.g., one set of frequency resources, such as one PRB, per feedback message such as an ACK or a NACK message). Sidelink feedback may also be multiplexed using code resources. For example, a number of cyclic shift (CS) pairs of a base sequence in each PRB of the feedback symbol (e.g., up to six CS pairs, where one CS for each CS pair corresponds to an ACK message and one CS for each CS pair corresponds to a NACK message).

The receiving UE 115-c may perform PSFCH resource mapping according to a mapping rule (e.g., an implicit mapping rule). A number of resources (e.g., a number of PRBs, such as four PRBs) may be allocated per subchannel (e.g., of channel 205) and per slot based on sidelink resources of a PSSCH transmission (e.g., on the PSSCH 0 or the PSSCH 1). PSFCH resources for HARQ feedback for received sidelink messages 220 may be mapped with combined PRBs (e.g., in the frequency domain) and CS pairs (e.g., in the code domain). For example, PRB group 210-a (e.g., four PRBs in PSFCH symbol 215, which may be referred to in ascending order of frequency as PRB PRB 1, PRB 2, and PRB 3) may be allocated for sidelink feedback signaling corresponding to any sidelink signaling received in sub-channel 0 (e.g., of channel 205) during slot 0. Similarly, PRB group 210-b may be allocated for sidelink feedback signaling corresponding to any sidelink signaling received in subchannel 0 and slot 1, PRB group 210-c may be allocated for sidelink feedback signaling corresponding to any sidelink signaling received in subchannel 1 and slot 0, PRB group 210-d may be allocated for sidelink feedback signaling corresponding to any sidelink signaling received in subchannel 1 and slot 1, PRB group 210-e may be allocated for sidelink feedback signaling corresponding to any sidelink signaling received in subchannel 2 and slot 0, and PRB group 210-f may be allocated for sidelink feedback signaling corresponding to any sidelink signaling received in subchannel 2 and slot 1. Thus, the receiving UE 115-c may determining, based on the mapping rule, in which feedback resources (e.g., in the PSFCH symbol 215) to transmit sidelink feedback based on the resources via which a sidelink message 220 was received.

The UE 115-c may receive a sidelink message 220-a via the PSSCH 0 (e.g., from a first transmitting UE 115-a), and may receive a sidelink message 220-b via the PSSCH 1 (e.g., from a second transmitting UE 115-b). The sidelink message 220-a may be associated with an identifier (e.g., ID is 0) for the transmitting UE 115-a, and the sidelink message 220-b may be associated with an identifier (e.g., ID is 1) for the transmitting UE 115-b.

The receiving UE 115-c may perform PSFCH resource mapping according to the mapping rule, and based on received unicast sidelink messages 220 according to equation 1:

$$\text{PSFCH Resource} = ID_{L1\text{-}source} \bmod (y \times x) \quad \text{Equation 1:}$$

where y=number of PRBs and x=number of CS pairs. For x=1 CS and y=4 PRBs in each PRB group 210, y·x=4·1=4 resources for transmitting sidelink feedback messages. For example, the UE 115-c may receive a sidelink message 220-a, which may be a unicast message received via at least a portion of sub-channel 1 and sub-channel 2, during slot 0 (e.g., sidelink resources corresponding to sidelink feedback resources of PRB group 210-c and PRB group 210-e, respectively). In such example, the UE may perform PSFCH mapping according to Equation 1 as follows: $ID_{L1\text{-}source}$ mod $(y \cdot x) = ID_{L1\text{-}source}(0) \bmod (4) = 0$, where $ID_{L1\text{-}source}$ refers to the Layer 1 source ID (e.g., transmitting UE 115-a's Layer 1 ID is 0) for the unicast sidelink message 220-a. In such examples, the UE 115-c may map a feedback message (e.g., an ACK or a NACK) for the sidelink message 220-a to PRB 0 of PRB group 210-c. Because the sidelink message 220-a spans at least a portion of sub-channel 1 and sub-channel 2, the UE 115-c may also map the feedback message to PRB 0 of PRB group 210-e. However, because the sidelink message 220-a was a unicast message for the UE 115-c, and because the UE 115-c may transmit a feedback message in PRB 0 of PRB group 210-c, a second feedback message in PRB 0 of PRB group 210-e may be redundant. In such examples, the UE 115-c may transmit the feedback message for the sidelink message 220-a in only one PRB group (e.g., in PRB 0 of the PRB group 210-c), and may refrain from transmitting a duplicate feedback message in PRB 0 of the PRB group 210-e. The transmitting UE 115-a may monitor the feedback message for the sidelink message 220-a in the PRB group (e.g., PRB 0 of the PRB group 210-c) based on the mapping.

In some examples, the sidelink message 220-a may be a groupcast message addressed to a set of UEs 115 (e.g., including the UE 115-c). The groupcast message may be a first type of groupcast (e.g., which may be referred to as groupcast type 1, or NACK-only groupcast). In such examples, each of the multiple receiving UEs 115 may not transmit ACK feedback upon successful reception of the sidelink message 220-a, and may instead transmit a NACK message in case of failed reception or decoding. If the transmitting UE 115 (e.g., the UE 115-a) receives one or more NACK messages from any of the receiving UEs 115, then the UE 115-a may retransmit sidelink message 220-a. The UEs 115 may map feedback signaling (e.g., a NACK message) to a single feedback resource (e.g., a single PRB) as follows: $ID_{TX} \bmod (y \times x) = ID_{TX}(0) \bmod (4) = 0$, where $ID_{TX}$ refers to the ID of the transmitting UE 115-a (e.g., transmitting UE 115-a's Layer 1 ID is 0). In such examples, the UE 115-c (e.g., and any other receiving UE 115) may map a sidelink NACK message to PRB 0 of PRB group 210-c (e.g., and may refrain from transmitting the sidelink NACK message during PRB of PRB group 210-e). The transmitting UE 115-a may monitor the feedback message for the sidelink message 220-a in the PRB group (e.g., PRB 0 of the PRB group 210-c) based on the mapping.

In some examples, the UE 115-c may receive sidelink message 220-b, which may be a second type of groupcast message (e.g. which may be referred to as a type 2 groupcast message). For example, the sidelink message 220-b may be groupcast to a number (e.g., 6) of UEs 115 with unique receiver UE identifiers within the group (e.g., member ID "0", member ID "1", member ID "2", member ID "3", member ID "4", and member ID "5"), where the UE 115-c may be associated with, for example, the member ID "2". The UE 115-c and the other receiving UEs 115 may perform PSFCH resource mapping according to equation 2:

$$\text{PSFCH Resource} = (ID_{TX} + M\_ID_{RX}) \bmod (y \times x) \quad \text{Equation 2:}$$

where $ID_{TX}$ may refer to the ID of the transmitting UE 115-b (e.g., Layer 1 ID is 1), and $M\_ID_{RX}$ may refer to the member ID of the receiving UE 115-c (e.g., the member ID is 2) within a group. Because the sidelink message 220-b spans both sub-channel 0 and sub-channel 1 in slot 1, the receiving UEs 115 may map sidelink feedback to one of PRB group 210-b and PRB group 210-d. In such examples, each of the receiving UEs 115 may perform PSFCH resource mapping as follows: $(ID_{TX} + M\_ID_{RX}) \bmod (y \times x) = (ID_{TX}(1) + M\_ID_{RX})$ mod (4)=PRBs 1, 2, and 3 in PRB group 210-*b* and PRBs 1, and 2 in PRB group 210-*d* (e.g., based on the six receiver member IDs with IDs 0, 1, 2, 3, 4, and 5). Thus, the UE 115-*c* with member ID "2" may perform PSFCH resource mapping according to $(ID_{TX}(1)+M\_ID_{RX}(2))$ mod (4)=PRB 3 of PRB group 210-*b*, and may transmit a feedback message in PRB 3 of PRB group 210-*b*. The other five receiving UEs 115 may similarly map feedback signaling to respective PRBs. The transmitting UE 115-*b* may monitor the feedback messages from all receiving UEs (member UEs) within the group for the sidelink message 220-*b* in the PRB groups (e.g., PRB 1-PRB 3 of the PRB group 210-*b* and PRB 0-PRB 2 of the PRB group 210-*d*) based on the mapping. Such mapping may assume one CS, and may be adjusted according to equation 1 and equation 2 for more CS pairs.

In some examples, UEs 115 may perform sidelink communications, as described herein, using unlicensed resources (e.g., the channel 205 may be an LBT channel or LBT sub-channel for accessing a unlicensed channel). In some examples, the communicating UEs 115 may be subject to an OCB condition. In such examples, the wireless communications system may mandate or support communications where the OCB is to be less than a declared nominal channel bandwidth for all transmissions (e.g., including data transmissions and feedback transmissions). UEs 115 may not be permitted to perform communications if they do not support a mode of transmission that satisfies a bandwidth of at least a threshold amount (e.g., seventy percent) of a declared nominal channel bandwidth. In such examples, UEs 115 may not be able to support sidelink communications and sidelink feedback signaling unless such sidelink signaling satisfies the threshold OCB condition. To satisfy the OCB condition, feedback signaling (e.g., HARQ ACK and HARQ NACK messages) from one or more receiving UEs 115 during a given PSFCH symbol 215 within an LBT-subchannel (e.g., the channel 205) may need to occupy at least the threshold amount (e.g., seventy percent) of the LBT-sub-channel (e.g., a 20 MHz sub-channel).

As described at least with reference to FIG. 2, a number of feedback transmission in a PSFCH symbol 215 of a channel 205 may vary dynamically based on a number of PSSCH transmissions associated with the PSFCH symbol 215, a number of transmission resources for each PSSCH transmissions, a cast type of sidelink transmissions (e.g., unicast, groupcast type 1, groupcast type 2, among other examples), or any combination therefore. For example, sidelink feedback for a unicast sidelink message or a groupcast type 1 sidelink message may map to a single PRB, while sidelink feedback for groupcast type 2 sidelink messages may map to multiple PRBs for multiple UEs 115. Thus, if only a few sidelink messages 220 are scheduled on sidelink resources, or if scheduled sidelink messages are primarily unicast or groupcast type 1 transmissions, then feedback signaling via the PSFCH symbol 215 may not satisfy the OCB condition. In such examples, the UEs 115, or the wireless communications system 200, may not support the feedback signaling, resulting in decreased reliability of sidelink communications, increased delays, increased system latency, less efficiency use of available unlicensed resources, and decreased user experience.

A fixed interlacing pattern may not be efficient for receiving UEs 115 to perform PSFCH resource mapping and satisfy the OCB conditions, while avoiding interference with each other. For example, an interlacing pattern with fewer interlace resources, or fewer interlaces of resources, may not result in a sufficient number of available feedback resources to satisfy the OCB condition if only a single HARQ feedback message is transmitted during a PSFCH symbol with in the LBT sub-channel. In some examples, an interlacing pattern with more interlaces and more resources available for interlaces of resources may result in overlapping transmissions, and increased interference among PSFCH transmissions if too many HARQ feedback messages are transmitted at a PSFCH symbol 215 within an LBT sub-channel.

Techniques described herein support an adaptive interlacing scheme for receiving UEs to transmit sidelink feedback and satisfy OCB conditions without interfering with each other. As described in greater detail with reference to FIGS. 3-7, each receiving UE 115 may detect any sidelink messages 220 transmitted on a given channel 205 (e.g., an LBT sub-channel). For example, a transmitting UE may receive configuration information (e.g., sidelink unlicensed configuration information) including parameters for a first or initial interlace (e.g., one or more contiguous or noncontiguous PRBs on the PSFCH symbol 215), and one or more replicas (e.g., additional interlaces) of the first interlace. The transmitting UE 115-*a* may transmit one or more sidelink messages, and may determine an allocation for the first interlace within the PSFCH symbol 215. The UE 115-*a* may monitor the first interlace for feedback information associated with the sidelink message based on the interlace mapping rule.

A receiving UE 115-*c* may receive configuration information (e.g., sidelink unlicensed configuration information) including parameters for a first or initial interlace, and one or more replicas (e.g., additional interlaces) of the first interlace. For instance, the first interlace may contain one or more contiguous or noncontiguous PRBs on which to transmit a sidelink feedback for a sidelink message received in a given set of time and frequency resources (e.g., a sub-channel or PRB and a slot). The configuration information may further indicate an offset or replication distance indicating a number of frequency resources (e.g., sub-channels or PRBs or interlace resource blocks (IRBs)) at which the UE may map a replica of the first interlace for transmission of the sidelink feedback. The receiving UE 115-*c* may determine, for each detected sidelink transmission, an allocation for a first interlace (e.g., one or more contiguous or noncontiguous PRBs based on pre-configuration or configuration) via the PSFCH symbol 215 based on the interlace mapping rule. The UE 115-*c* may also determine allocations for one or more replicas of the first interlace associated with a sidelink transmission for the UE 115-*c* based on a replication distance (e.g., configured in the configuration information, or preconfigured). For example, the UE 115-*c* may determine an allocation of each first interlace for each detected sidelink message 220 (e.g., whether detected sidelink messages 220 are for the UE 115-*c* or not). For each sidelink message 220 that is addressed to the UE 115-*c*, the UE 115-*c* may determine an allocated first interlace (e.g., PRBs on which to transmit sidelink feedback for the received sidelink message 220) and one or more replicas of the first interlace.

The UE 115-*c* may then determine one or more allocated replica interlaces of the first interlace. If a replica interlace of the first interlace does not overlap with an initial interlace for another sidelink message addressed to any UE 115 (e.g., a first interlace for the UE 115-*c* or the other UE 115), then the UE 115-*c* may also transmit the feedback message in the replica interlace. However, if the resources of the replica interlace are to be occupied by an initial interlace for another sidelink message addressed to any UE 115 (e.g., as determined by the UE 115-*c* based on the mapping and detecting all sidelink transmissions on the LBT sub-channel), then the UE 115-c may refrain from transmitting the sidelink feedback message via the replica interlace. The UE 115-c may then transmit the first interlace, and the one or more replicas (e.g., additional interlaces) interlaced in the PSFCH symbol 215. The combination of initial interlaces of feedback signaling and replica interlaces for unoccupied resources may result in feedback signaling via the PSFCH symbol 215 that satisfies the OCB condition. As described herein, techniques described with reference to sub-channel 0, sub-channel 1, and sub-channel 2, may similarly be performed for any set of frequency resources (e.g., PRBs, channels, etc.).

Figure 3:
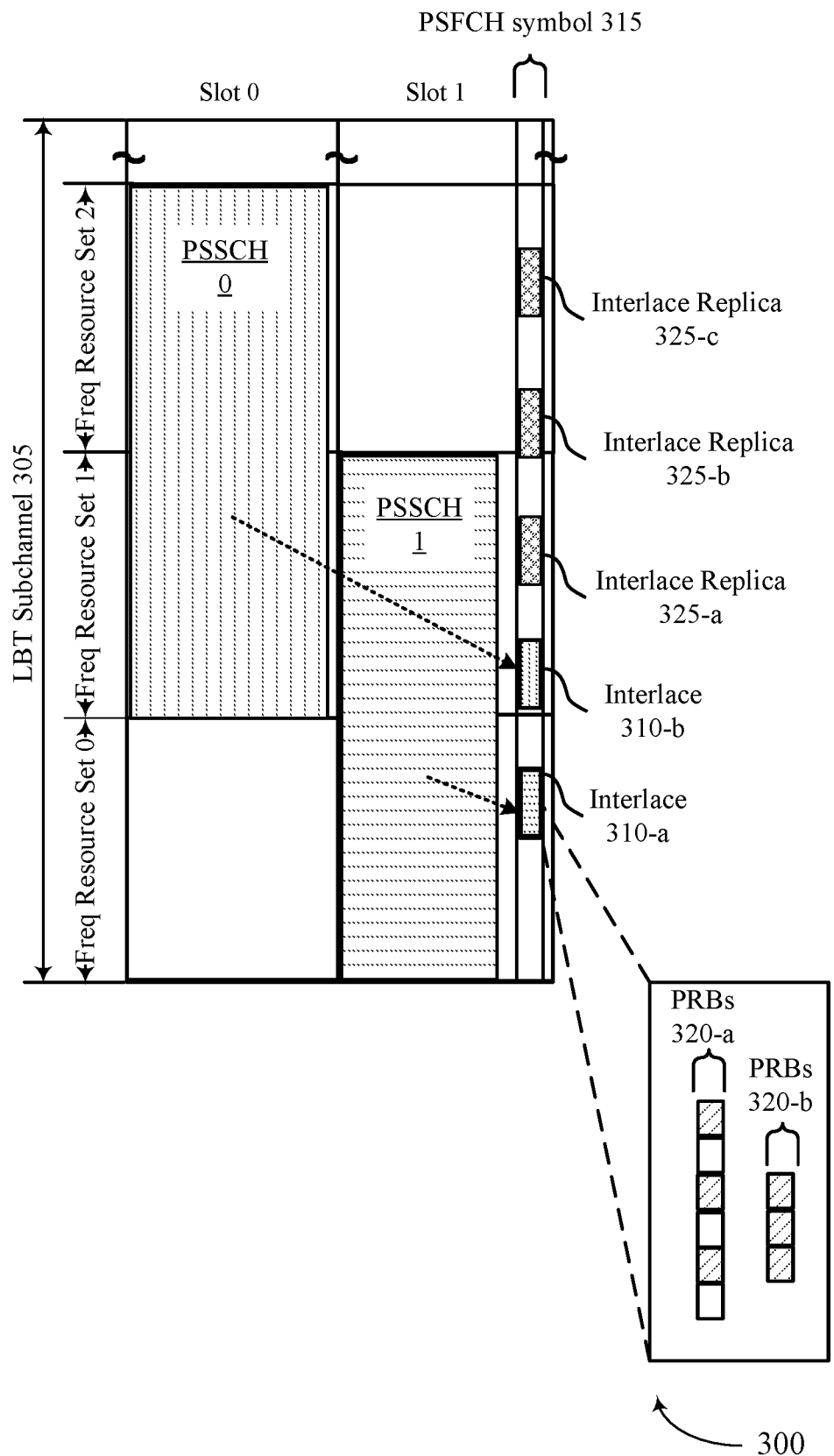
FIG. 3 illustrates an example of a sidelink interlace feedback scheme that supports interlaced feedback for sidelink communications via unlicensed channels in accordance with one or more aspects of the present disclosure.

FIG. 3 illustrates an example of a sidelink interlace feedback scheme 300 that supports interlaced feedback for sidelink communications via unlicensed channels in accordance with one or more aspects of the present disclosure. Sidelink interlace feedback scheme 300 may implement, or be implemented by, aspects of wireless communications system 100 and wireless communication system 200. For example, one or more UEs (e.g., UEs 115) and one or more network entities (e.g., network entities 105), which may be examples of corresponding devices described with reference to FIGS. 1-2, may perform wireless communications according to the sidelink interlace feedback scheme 300. The UEs may communicate sidelink data during one or more PSSCHs (e.g., the PSSCH 0 and the PSSCH 1), which may be associated with a feedback symbol (e.g., the PSFCH symbol 315). The PSFCH symbol 315 may be allocated per sets of time resources (e.g., every 1, 2, or 4 slots) within a resource pool based on pre-configuration or configuration. The UEs may communicate with each other using unlicensed spectrum, such as LBT subchannel 305, in one or more time resources (e.g., slot 0 and slot 1), and one or more frequency resources (e.g., freq resource set 0, freq resource set L and freq resource set 2, which may be examples of sub-channels or PRBs or interlace resource blocks (IRBs) of the LBT subchannel 305).

To satisfy an OCB requirement as described with reference to FIG. 2, one or more UEs may perform an adaptive interlacing scheme for mapping and transmitting HARQ feedback via a first (e.g., initial) interlace for sidelink feedback and one or more replicas (e.g., additional interlaces) of the first interlace based on sidelink transmissions (e.g., PSSCH transmissions sharing a common PSFCH symbol 315) and respective cast types of the sidelink transmissions. For example, one or two transmitting UEs may transmit respectively a first sidelink message via PSSCH 0, and a second sidelink message via PSSCH 1. A receiving UE may detect both of the sidelink messages in respective PSSCHs sharing the PSFCH symbol 315. The receiving UE may determine an allocation for a first interlace for each detected sidelink message. Each interlace or interlace replica may include a number of PRBs (e.g., a number (e.g., z) of contiguous PRBs 320-*b*, or noncontiguous PRBs 320-*a*) based on pre-configuration or configuration. Each PRB in each interlace may have the same CSs or different CSs based on pre-configuration or configuration. For instance, the receiving UE may determine an allocation of interlace 310-*b* for the sidelink message detected via the PSSCH 0 and the interlace 310-*a* for the sidelink message detected via the PSSCH 1. The first interlace 310-*a* for the sidelink message detected in PSSCH 1 may carry feedback signaling (e.g., HARQ ACK or HARQ NACK) via the PSFCH symbol 315 based on the interlace mapping rule. The first (e.g., initial) interlace 310-*b* for the sidelink message detected in PSSCH 0 may carry feedback signaling (e.g., HARQ ACK or HARQ NACK) via the PSFCH symbol 315 based on the interlace mapping rule.

The receiving UE may further determine an allocation for one or more replicas of a first (e.g., initial) interlace associated with the detected message addressed to the receiving UE. The receiving UE may determine the allocation for each interlace replica 325 based on an offset of replication distance (e.g., preconfigured or configured in configuration information, or the like). The receiving UE may determine that interlace replica 325-*a* and interlace replica 325-*c* are allocated for replicase of first interlace 310-*a* if the detected message via the PSSCH 1 is addressed to the receiving UE. The receiving UE may further determine that interlace replica 325-*b* is allocated for a replica of first interlace 310-*b* if the detected message via the PSSCH 0 is addressed to the receiving UE. The receiving UE may transmit sidelink feedback for the sidelink message received via the PSSCH 1 via interlace 310-*a* and via interlace replica 325-*a* and the interlace replica 325-*c*. Similarly, the receiving UE may transmit sidelink feedback for the sidelink message received via the PSSCH 0 via the first interlace 310-*b* and via the interlace replica 325-*b*. By doing so, the receiving UE may transmit feedback signaling via the PSFCH symbol 315 that satisfies an OCB condition for the LBT subchannel 305.

The one or two transmitting UEs may determine the respective allocation for the first interlace 310-*a* and the first interlace 310-*b* based on the interlace mapping rule, and may monitor respectively the first interlace 310-*a* and the first interlace 310-*b* according to the determined allocation.

Figure 4:
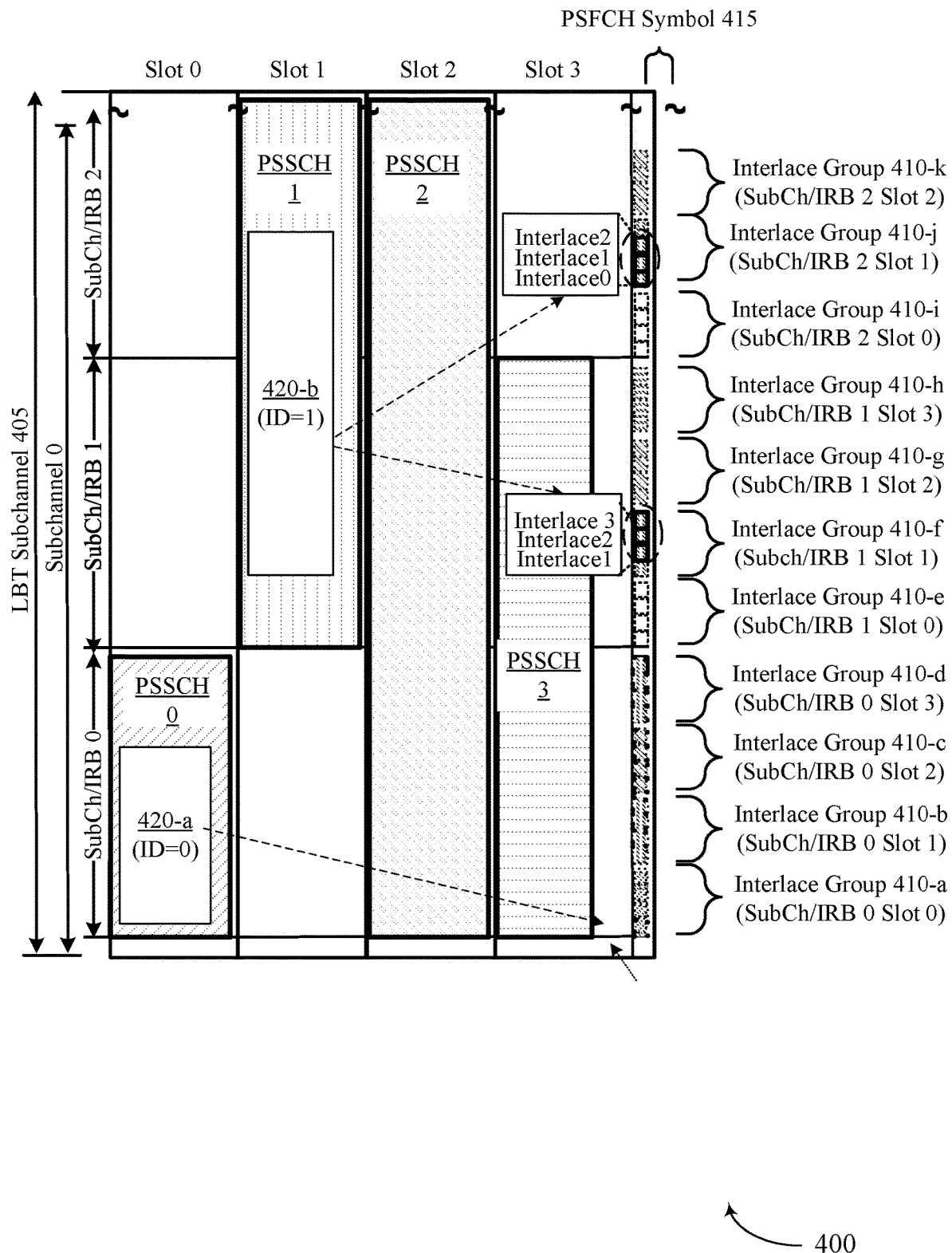
FIG. 4 illustrates an example of a sidelink interlace feedback scheme that supports interlaced feedback for sidelink communications via unlicensed channels in accordance with one or more aspects of the present disclosure.

FIG. 4 illustrates an example of a sidelink interlace feedback scheme 400 that supports interlaced feedback for sidelink communications via unlicensed channels in accordance with one or more aspects of the present disclosure. Sidelink interlace feedback scheme 400 may implement, or be implemented by, aspects of wireless communications system 100 and wireless communication system 200, as well as sidelink interlace feedback scheme 300. For example, one or more UEs (e.g., UEs 115) and one or more network entities (e.g., network entities 105), which may be examples of corresponding devices described with reference to FIGS. 1-3, may perform wireless communications according to the sidelink interlace feedback scheme 400. The UEs may communicate sidelink data during one or more PSSCHs (e.g., the PSSCH 0, the PSSCH 1, the PSSCH 2, and the PSSCH 3), which may be associated with a feedback symbol (e.g., the PSFCH symbol 415). The PSFCH symbol 415 may be allocated per sets of time resources (e.g., every 1, 2, or 4 slots) within a resource pool based on pre-configuration or configuration. The UEs may communicate with each other using unlicensed spectrum, such as LBT subchannel 405, in one or more time resources (e.g., slot 0, slot 1, slot 2, and slot 3), and one or more frequency resources (e.g., frequency resource set such as sub-channel or interlace resource block (IRB) IRB 0, IRB 1, and IRB 2, or any other subsets of frequency resources, such as sub-channels of LBT subchannel 405). In some examples, the IRBs may be located within a subchannel (e.g., subchannel 0). For example, a sub-channel may contain one or more IRBs.

In some examples, a receiving UE may allocate first (e.g., initial) interlaces associated with sidelink transmissions detected on PSSCHs sharing the PSFCH symbol 415 based on PSSCH transmission resources in frequency (e.g., sub-channels or IRBs) and in time (e.g., slots), as well as different cast types based on the interlace mapping rule. For example, the UE may perform PSFCH resource mapping according to the mapping rule for one or more interlace groups 410 (e.g., each interlace group including a number of interlaces, such as 4 interlaces). As described in greater detail with reference to FIG. 3, each interlace may include one or more PRBs or IRBs, and multiple PRBs or IRBs in an interlace may be contiguous or noncontiguous, and may be associated with the same CS pair or different CS pairs), based on pre-configuration or configuration. Each interlace group 410 may be mapped, according to the interlace mapping rule, per frequency (e.g., sub-channel or IRB) and per time (e.g., slot). For example, interlace group 410-*a* may map to PSSCH 0 located in sub-channel or IRB 0 and slot 0, interlace group 410-*b* may map to a PSSCH located in sub-channel or IRB 0 and slot 1, IRB group 410-*c* may map to PSSCH 2 in sub-channel or IRB 0 and slot 2, and interlace group 410-*d* may map to PSSCH 3 in sub-channel or IRB 0 and slot 3. Similarly, interlace group 410-*e* may map to a PSSCH located in IRB 1 slot 0, interlace group 410-*f* may map to PSSCH 1 in sub-channel or IRB 1 and slot 1, interlace group 410-*g* may map to PSSCH 2 in sub-channel or IRB 1 and slot 1, and interlace group 410-*h* may map to PSSCH 3 in sub-channel or IRB 1 and slot 3. Interlace group 410-*i* may map to a PSSCH located in sub-channel or IRB 2 in slot 0, interlace group 410-*j* may map to PSSCH 1 in sub-channel or IRB 2 slot 1, and interlace group 410-*k*, may map to PSSCH 2 in sub-channel or IRB 2 and slot 2, etc.

A first or initial interlace may be allocated within a group of interlaces based on the cast type of the sidelink messages 420, and related HARQ feedback. For example, the receiving UE may receive a sidelink message 420-*a* (e.g., a unicast sidelink message associated with a transmitter or layer 1 identifier ID as "0"). The UE may determine an allocated interlace according to equation 3:

$$\text{PSFCH Interlace}=\text{ID} \bmod (i \times j) \qquad \text{Equation 3:}$$

Where ID indicates an identifier for the transmitter of the sidelink message 420-*a*, i represents a number of interlaces per interlace group 410, and j represents a number of CS pairs per interlace group 410. Thus, the receiving UE may determine an allocated interlace via PSFCH Interlace=ID mod (i×j)=0 mod (4×1)=0 where ID=0 for the transmitting UE's ID, i=4 for 4 interlaces per interlace group and j=1 for one CS pair per interlace group (e.g., an interlace 0 of interlaces 0, 1, 2, and 3) within interlace group 410-*a* for the sidelink message 420-*a*.

In some examples, the sidelink message 420-*a* may be a groupcast type 1 message. In such examples, the receiving UE may determine an allocated interlace according to equation 4:

$$\text{PSFCH Interlace}=\text{ID} \bmod (i \times j) \qquad \text{Equation 4:}$$

where ID indicates an identifier for the transmitter of the sidelink message 420-*a*, i represents a number of interlaces per interlace group 410, and j represents a number of CS pairs per interlace group 410. In such examples, the receiving UE may determine an allocated interlace via PSFCH Interlace=ID mod (i×j)=0 mod (4×1)=0 where ID=0 for the transmitting UE's ID, i=4 for 4 interlaces per interlace group and j=1 for one CS pair per interlace group (e.g., an interlace 0 of interlaces 0, 1, 2, and 3) within interlace group 410-*a* for a NACK message for sidelink message 420-*a*.

Similarly, the receiving UE may receive a sidelink message 420-*b* (e.g., a groupcast type 2 sidelink message associated with ID "1" for the transmitting UE), and may determine allocated interlaces in interlace group 410-*f* and in interlace group 410-*j* according to equation 5:

$$\text{PSFCH Interlace}=(\text{ID}+\text{ID}_{MRX})\bmod(i \times j) \qquad \text{Equation 5:}$$

where D indicates an identifier for the transmitter of the sidelink message 420-*a*, $\text{ID}_{MRX}$ indicates an identifier for the receiving UE, i represents a number of interlaces per interlace group 410, and j represents a number of CS pairs per interlace group 410. The receiving UE may thus determine an interlace for transmitting the feedback for the sidelink message 420-*b* (e.g., interlace 1, 2, and 3 of interlace group 410-*f* via PSFCH Interlaces=(ID+$\text{ID}_{MRX}$) mod (i×j)=(1+{0, 1, 2}) mod (4×1)={1, 2, 3} mod 4={1, 2, 3} where ID=1 for the transmitting UE's ID, i=4 for 4 interlaces per interlace group and j=1 for one CS pair per interlace group, and interlace 0, 1, and 2 of interlace group 410-*j* via PSFCH Interlaces=(ID+$\text{ID}_{MRX}$) mod (i×j)=(1+{3, 4, 5}) mod (4×1)={4, 5, 6} mod 4={0, 1, 2}, for six receiving UEs having member IDs as "0", "1", "2", "3", "4", and "5"). The receiving UE may also determine one or more replica interlaces of the first interlace associated with the sidelink transmission addressed to the receiving UE, as described in greater detail with reference to FIG. 3. A transmitting UE may perform the mapping techniques described with reference to FIGS. 3 and 4 to determine allocated first interlaces associated with respective sidelink transmissions on which to monitor for sidelink feedback signaling to its sidelink transmissions.

Figure 5:
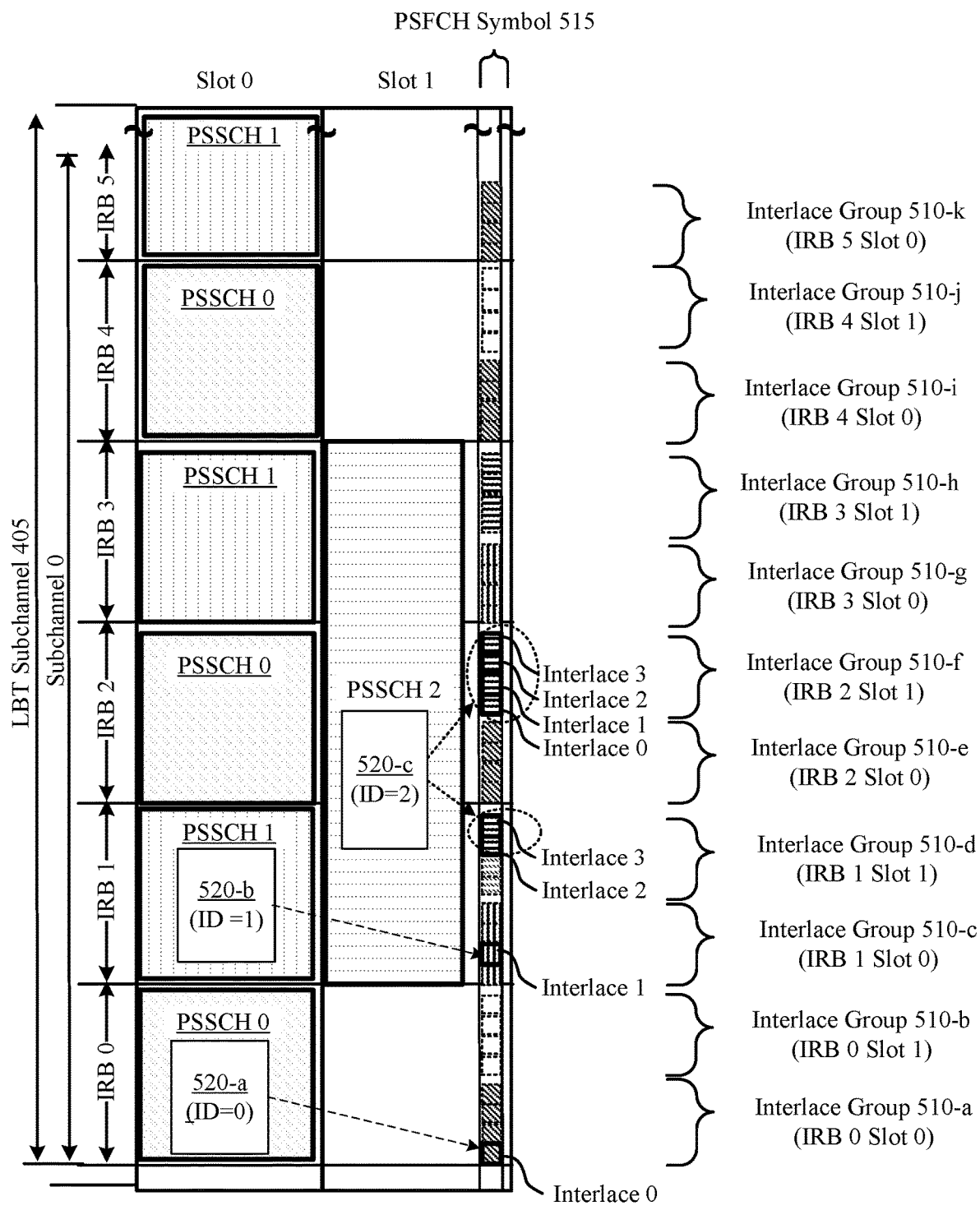
FIG. 5 illustrates an example of a sidelink interlace feedback scheme that supports interlaced feedback for sidelink communications via unlicensed channels in accordance with one or more aspects of the present disclosure.

FIG. 5 illustrates an example of a sidelink interlace feedback scheme 500 that supports interlaced feedback for sidelink communications via unlicensed channels in accordance with one or more aspects of the present disclosure. Sidelink interlace feedback scheme 500 may implement, or be implemented by, aspects of wireless communications system 100 and wireless communication system 200, as well as sidelink interlace feedback scheme 300 and sidelink interlace feedback scheme 400. For example, one or more UEs (e.g., UEs 115) and one or more network entities (e.g., network entities 105), which may be examples of corresponding devices described with reference to FIGS. 1-4, may perform wireless communications according to the sidelink interlace feedback scheme 500. The UEs may communicate sidelink data during one or more PSSCHs (e.g., the PSSCH 0, the PSSCH 1, and the PSSCH 2), which may be associated with a feedback symbol (e.g., the PSFCH symbol 515). The PSFCH symbol 515 may be allocated per sets of time resources (e.g., every 1, 2, or 4 slots) within a resource pool based on pre-configuration or configuration. The UEs may communicate with each other using unlicensed spectrum, such as LBT subchannel 505, in one or more time resources (e.g., slot 0, and slot 1), and one or more frequency resources (e.g., frequency resource sets such as IRB 0, IRB 1, IRB 2, IRB 3, IRB 4, and IRB 5, or any other subsets of frequency resources, such as sub-channels of LBT subchannel 505). In some examples, the IRBs may be located within a subchannel (e.g., subchannel 0).

A receiving UE may allocate a first (e.g., initial) interlace for each detected sidelink messages 520 (e.g., whether addressed to the receiving UE or not) interlaced in frequency (e.g., frequency domain multiplexed (FDM) sidelink messages 520-*a* and 520-*b* in slot 0) or not interlaced in frequency (e.g., sidelink messages 520-*c* in slot 1), where the sidelink messages 520 share a PSFCH symbol 515. A receiving UE may determine an allocation for a first (e.g., initial) interlace for each detected sidelink transmission on a PSSCH based on the PSSCH transmission resource in frequency (e.g., IRBs) and time (e.g., slots), and different cast types using the interlace mapping rule (e.g., which may be configured by the network or another sidelink UE, or may be preconfigured by manufacturer or service provider or defined in one or more standards documents). Similarly, a transmitting UE may determine an allocation for a first interlace for its sidelink transmission interlaced or not interlaced in frequency on a PSSCH based on the PSSCH transmission resource in frequency and time, and different cast types using the interlace mapping rule and monitor the first interlace for sidelink feedback to its sidelink transmission.

Groups of interlaces (e.g., interlace groups 510) may be mapped per PSSCH transmission resources in frequency (e.g., IRB) and per PSSCH transmission resources in time (e.g., slot). Each interlace group 510 may include one or more PRBs (e.g., 4 PRBs per interlace group 510). For example, interlace group 510-*a* may map to PSSCH 0 in IRB 0 and slot 0 and interlace group 510-*b* may map to a PSSCH in IRB 0 and slot 1. Interlace group 510-*c* may map to PSSCH 1 in IRB 1 and slot 0 and interlace group 510-*d* may map to PSSCH 2 in IRB 1 and slot 1. Interlace group 510-*e* may map to PSSCH 0 in IRB 2 and slot 0 and interlace group 510-*f* may map to PSSCH 2 in IRB 2 and slot 1. Interlace group 510-*g* may map to PSSCH 1 in IRB 3 and slot 0 and interlace group 510-*h* may map to PSSCH 2 in IRB 3 and slot 1. Interlace group 510-*i* may map to PSCH 0 in IRB 4 and slot 0 and interlace group 510-*j* may map to a PSSCH in IRB 4 and slot 1. Interlace group 510-*k* may map to PSSCH 1 in IRB 5 and slot 0, etc.

A first interlace for a sidelink message 520 may be allocated within an interlace group 510 based on cast type and related HARQ feedback. For example, the receiving UE may detect a unicast message (e.g., from a transmitting UE) associated with a transmitting UE ID (e.g., ID=0) with PSSCH 0 where PSSCH 0 is interlaced with PSSCH 1. The UE may perform a first PSFCH interlace mapping as follows using Equation 3 (as described in details for FIG. 4): PSFCH Interlace=ID mod (i×j)=0 mod (4×1)=0 where ID=0 for the transmitting UE's ID, i=4 for 4 interlaces per interlace group and j=1 for one CS pair per interlace group. The receiving UE may map the first interlace for the sidelink message 520-*a* to interlace 0 in interlace group 510-*a*.

The receiving UE may detect a sidelink message 520-*b* via PSSCH 1 where PSSCH 1 is interlaced with PSSCH 0, and sidelink message 520-*b* may be a groupcast type 1 sidelink message. The UE may perform a first PSFCH interlace mapping as follows using Equation 4 (as described in details for FIG. 4): PSFCH Interlace=ID mod (i×j)=1 mod (4×1)=1, where ID=1 for the transmitting UE's ID, i=4 for 4 interlaces per interlace group and j=1 for one CS pair per interlace group. The receiving UE may map the first interlace for the sidelink message 520-*b* to interlace 1 in interlace group 510-*c*.

A transmitting UE may transmit sidelink message 520-*c* in PSSCH 2. The sidelink message 520-*c* may be a groupcast type 2 message (e.g., addressed to 6 UEs having member IDs as "0", "1", "2", "3", "4", and "5", respectively). Each receiving UE may perform PSFCH resource mapping. For a receiving UE with member ID as $ID_{MRX}$=0, using Equation 5 (as described in details for FIG. 4) PSFCH Interlace=(ID+$ID_{MRX}$) mod (i×j)=(2+0) mod (4×1)=2 mod 4=2, where ID=2 for the transmitting UE's ID, i=4 for 4 interlaces per interlace group and j=1 for one CS pair per interlace group, the receiving UE may map the first interlace for sidelink message 520-*c* to interlace 2 of interlace group 510-*d*. For a receiving UE with member ID as $ID_{MRX}$=1, using PSFCH Interlace=(ID+$ID_{MRX}$) mod (i×j)=(2+1)mod(4×1)=3, the receiving UE may map the first interlace for sidelink message 520-*c* to interlace 3 of interlace group 510-*d*. For a receiving UE with member ID as $ID_{MRX}$=2, using PSFCH Interlace=(ID+$ID_{MRX}$) mod (i×j)=(2+2) mod(4×1)=0, the receiving UE may map the first interlace for sidelink message 520-*c* to interlace 0 of interlace group 510-*f*. For a receiving UE with member ID as $ID_{MRX}$=3, using PSFCH Interlace=(ID+$ID_{MRX}$) mod(i×j)=(2+3) mod(4×1)=1, the receiving UE may map the first interlace for sidelink message 520-*c* to interlace 1 of interlace group 510-*f*. For a receiving UE with member ID as $ID_{MRX}$=4, using PSFCH Interlace=(ID+$ID_{MRX}$) mod(i×j)=(2+4) mod(4×1)=2, the receiving UE may map the first interlace for sidelink message 520-*c* to interlace 2 of interlace group 510-*f*. For a receiving UE with member ID as $ID_{MRX}$=5, PSFCH Interlace=(ID+$ID_{MRX}$)mod(i×j)=(2+5)mod(4×1)=3, the receiving UE may map the first interlace for sidelink message 520-*c* to interlace 3 of interlace group 510-*f*.

The receiving UE may also determine one or more replica interlaces of a first interlace associated with the sidelink transmission on PSSCH addressed to the receiving UE, as described in greater detail with reference to FIG. 3 and FIGS. 6-7. A transmitting UE may perform the mapping techniques described with reference to FIGS. 3-5 to determine allocated first interlaces associated with its transmissions on which to monitor for sidelink feedback signaling to its transmissions.

Figure 6:
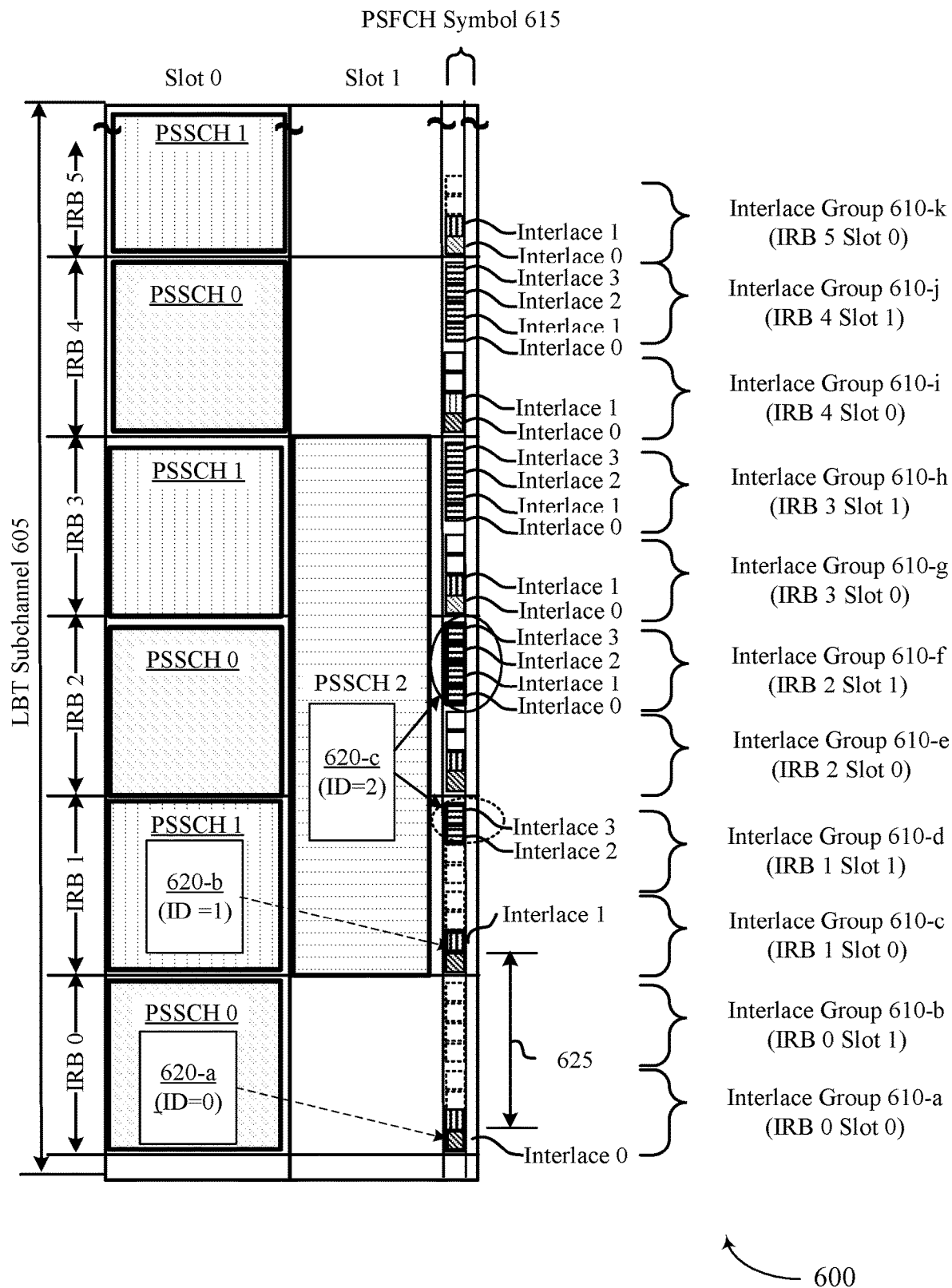
FIG. 6 illustrates an example of a sidelink interlace feedback scheme that supports interlaced feedback for sidelink communications via unlicensed channels in accordance with one or more aspects of the present disclosure.

FIG. 6 illustrates an example of a sidelink interlace feedback scheme 600 that supports interlaced feedback for sidelink communications via unlicensed channel in accordance with one or more aspects of the present disclosure. Sidelink interlace feedback scheme 600 may implement, or be implemented by, aspects of wireless communications system 100 and wireless communication system 200, as well as sidelink interlace feedback scheme 300, sidelink interlace feedback scheme 400, and sidelink interlace feedback scheme 500. For example, one or more UEs (e.g., UEs 115) and one or more network entities (e.g., network entities 105), which may be examples of corresponding devices described with reference to FIGS. 1-5, may perform wireless communications according to the sidelink interlace feedback scheme 600. The UEs may communicate sidelink data during one or more PSSCHs (e.g., the PSSCH 0, the PSSCH 1, and the PSSCH 2), which may be associated with a feedback symbol (e.g., the PSFCH symbol 615). The PSFCH symbol 615 may be allocated per sets of time resources (e.g., every 1, 2, or 4 slots) within a resource pool based on pre-configuration or configuration. The UEs may communicate with each other using unlicensed spectrum, such as LBT subchannel 605, in one or more time resources (e.g., slot 0, and slot 1), and one or more frequency resources sets such as IRB 0, IRB 1, IRB 2, IRB 3, IRB 4, and IRB 5, or any other subsets of frequency resources, such as sub-channels of LBT subchannel 605).

The receiving UE may determine an allocation for one or more replicas of each first interlace associated with the sidelink transmissions addressed to the receiving UE, which may support satisfaction of an OCB condition. The receiving UE may determine the allocation for the replicas based on each first (e.g. initial) interlace for each detected sidelink message (e.g., regardless of whether the sidelink message is addressed to the receiving UE). The receiving UE may ignore replicas of other sidelink interlaces transmitted by other UEs, as described herein. For example, the UE may detect all sidelink transmissions, within the LBT subchannel 605 that share a common PSFCH symbol 615 (e.g., any sidelink transmissions that share the PSFCH symbol 615 associated with the sidelink messages 620 for the receiving UE and/or other UEs). The receiving UE may calculate all first interlaces associated with detected sidelink transmissions (e.g., the receiving UE may decode SCI for cast types or HARQ feedback types and layer 1 source identifiers or layer 1 transmitter identifiers, or receiver member identifiers, or any combination thereof, to detect all sidelink messages transmitted during resources associated with the PSFCH symbol 615). The receiving UE may detect one or more sidelink messages 620, and may map sidelink feedback first interlaces with PSFCH symbol 615 as described herein. For example, as described in greater detail with reference to FIG. 5, the receiving UE may detect a unicast sidelink message 620-a via the PSSCH 0 and a groupcast type 1 sidelink message 620-b via the PSSCH 1 in slot 0 (e.g., PSSCH 0 and PSSCH 1 are interlaced in slot 0), and a groupcast type 2 sidelink message 620-c via the PSSCH 2 in slot 1 (e.g., PSSCH2 is not interlaced in slot 1). The receiving UE may map a first interlace (e.g., an initial interlace) for the sidelink message 620-a to interlace 0 in interlace group 610-a, may map a first interlace for the sidelink message 620-b to interlace 1 of the interlace group 610-c, and may map a first interlace for the sidelink message 620-c to interlace 2 of the interlace group 610-d (e.g., for the member ID $ID_{MRX}=0$), a first interlace for the sidelink message 620-c to interlace 3 of the interlace group 610-d (e.g., for the member ID $ID_{MRX}=1$), a first interlace for the sidelink message 620-c to interlace 0 of the interlace group 610-f (e.g., for the member ID $ID_{MRX}=2$), a first interlace for the sidelink message 620-c to interlace 1 of the interlace group 610-f (e.g., for the member ID $ID_{MRX}=3$, a first interlace for the sidelink message 620-c to interlace 2 of the interlace group 610-f (e.g., for the member ID $ID_{MRX}=4$, and a first interlace for the sidelink message 620-c to interlace 3 of the interlace group 610-f (e.g., for the member ID $ID_{MRX}=5$.

Having determined allocations of initial interlaces for each detected sidelink message 620, the UE may determine allocations for one or more replicas of the first interlace associated with a sidelink transmission addressed to the UE 115 (e.g., without reference to any additional sidelink transmissions for other UEs). In some examples, the allocations for replicas of interlaces may be based on a replication mapping rule, for example, a replication distance, which may be configured or preconfigured, or indicated in one or more standards documents. For example, replication distance 625 may indicate a number of resources (e.g., a number of PRBs, a number of subchannels, or a number of IRBs, among other examples). The receiving UE may map replicas of interlaces to the PSFCH symbol according to the replication mapping rule, for example, the replication distance 625.

If a replica of a first interlace for a first sidelink transmission (e.g., addressed to the receiving UE) does not overlap with a first interlace (e.g., an initial interlace) for a second sidelink transmission (e.g., addressed to the receiving UE or not), then the receiving UE may transmit the replica of the first interlace for the first sidelink message. For example, the receiving UE may map a first interlace to interlace 0 of interlace group 610-a for the sidelink message 620-a. The receiving UE may further map a replica of the first interlace (e.g., a second interlace) to interlace 0 of interlace group 610-c. As there is no first (e.g., initial) interlace occupying interlace 0 of interlace group 610-c based on the replication distance 625 (e.g., 1 IRB as shown), the receiving UE may also replicate the feedback message via a second interlace (a first replica interlace) at interlace 0 of interlace group 610-c. Similarly, in the absence of a first interlace occupying the mapped replica interlaces, the UE may replicate the sidelink feedback message for the sidelink message 620-a via a third interlace (a second replica interlace) at interlace 0 of interlace group 610-e, a forth interlace (a third replica interlace) at interlace 0 of interlace group 610-g, a fifth interlace (a fourth replica interlace) at interlace 0 of int interlace group 610-i, and a sixth interlace (a fifth replica interlace) at interlace 0 of interlace group 610-k (e.g., according to the replication distance 625 and the interlace mapping rule). Similarly, the UE may transmit a feedback message for the sidelink message 620-b in the first interlace via interlace 1 of interlace group 610-c, and may also replicate the sidelink feedback message for the sidelink message 620-b via a second interlace (a first replica interlace) at interlace 1 of interlace group 610-a, a third interlace (a second replica interlace) at interlace 1 of interlace group 610-e, a fourth interlace (a third replica interlace) at interlace 1 of interlace group 610-g, a fifth interlace (a fourth replica interlace) at interlace 1 of interlace group 610-i, and a sixth interlace (a fifth replica interlace) at interlace 1 of interlace group 610-k.

If a replica of a first interlace for a first sidelink transmission overlaps with a first interlace of a second sidelink transmission, the replica of the first interlace of the first sidelink transmission may be dropped by the receiving UE to avoid interference to a first interlace, according to the interlace mapping rule. For example, the UE may transmit sidelink feedback for the sidelink message 620-c via a first interlace at interlace 2 of interlace group 610-d (e.g., if the member ID $ID_{MRX}=0$ for the receiving UE). According to the replication mapping rule (e.g., replication distance 625), the UE may map a replica interlace of the first interlace to interlace 2 of interlace group 610-f. However, interlace 2 of interlace group 610-f may be occupied with a first (e.g., initial) interlace for another UE (e.g., with the member ID $ID_{MRX}=4$, as described in greater detail with reference to FIG. 5). Thus, the receiving UE with $ID_{MRX}=0$ may refrain from transmitting a replica interlace via interlace 2 of interlace group 610-f, because interlace 2 of interlace group 610-f is occupied by a first interlace transmitted by another device. Similarly, if the receiving UE maps a replica of a first interlace to a resource that is occupied by a first interlace for another sidelink message (e.g., either the other sidelink message is addressed to the receiving UE or not), the receiving UE may refrain from replicating sidelink feedback via a mapped replica interlace. The receiving UE may determine whether PSFCH symbol 615 is occupied at any given interlace based on detecting all sidelink transmissions associated with PSFCH symbol 615, and applying the interlace mapping rule for respective first interlaces as described herein with reference to FIGS. 2-7.

Replica interlaces transmitted by a given UE may overlap with replica interlace transmitted by any other UE (e.g., or transmitted by the same UE). The transmitting UE may monitor resources associated with the first (e.g., initial) interlace, and therefore may refrain from monitoring PSFCH symbols associated with replica interlaces. For example, according to the interlace mapping rule and the replication distance 625, a receiving UE 115 having a member ID $ID_{MRX}=0$ may transmit feedback signaling for the sidelink message 620-c via a first interlace at interlace 2 of interlace group 610-d, and may map a replica interlace to interlace 2 of interlace group 610-h. Another receiving UE having a member ID $ID_{MRX}=4$ may transmit feedback signaling for the sidelink message 620-c via a first interlace 2 of interlace group 610-f, and may map a replica interlace to interlace 2 of interlace group 610-h. Despite the fact that interlace 2 of interlace group 610-h is occupied by a replica interlace for both the UE with member ID $ID_{MRX}=0$ and the UE with member ID $ID_{MRX}=0$, both UEs may transmit the replica interlace (e.g., instead of one UE deferring to the other, as would be the case if one UE were transmitting an initial interlace). The transmitting UE may monitor interlace 2 of interlace group 610-*d* for feedback signaling associated with the UE with member ID $ID_{MRX}=0$, and may monitor the interlace 2 of interlace group 610-*f* for feedback signaling associated with the UE with member ID $ID_{MRX}=4$. Thus, interference caused by the UEs via the interlace 2 of interlace group 610-*h* (e.g., and interlace group 610-*j*) may not have a negative impact on reception of feedback signaling by the transmitting UE.

As described herein, transmitting feedback via first interlaces and replicas of first interlaces for each received sidelink message 620 (e.g., without causing interference to other initial interlaces) may result in clear and reliable feedback signaling for sidelink messages 620, without causing additional interference, and while satisfying an OCB condition.

Figure 7:
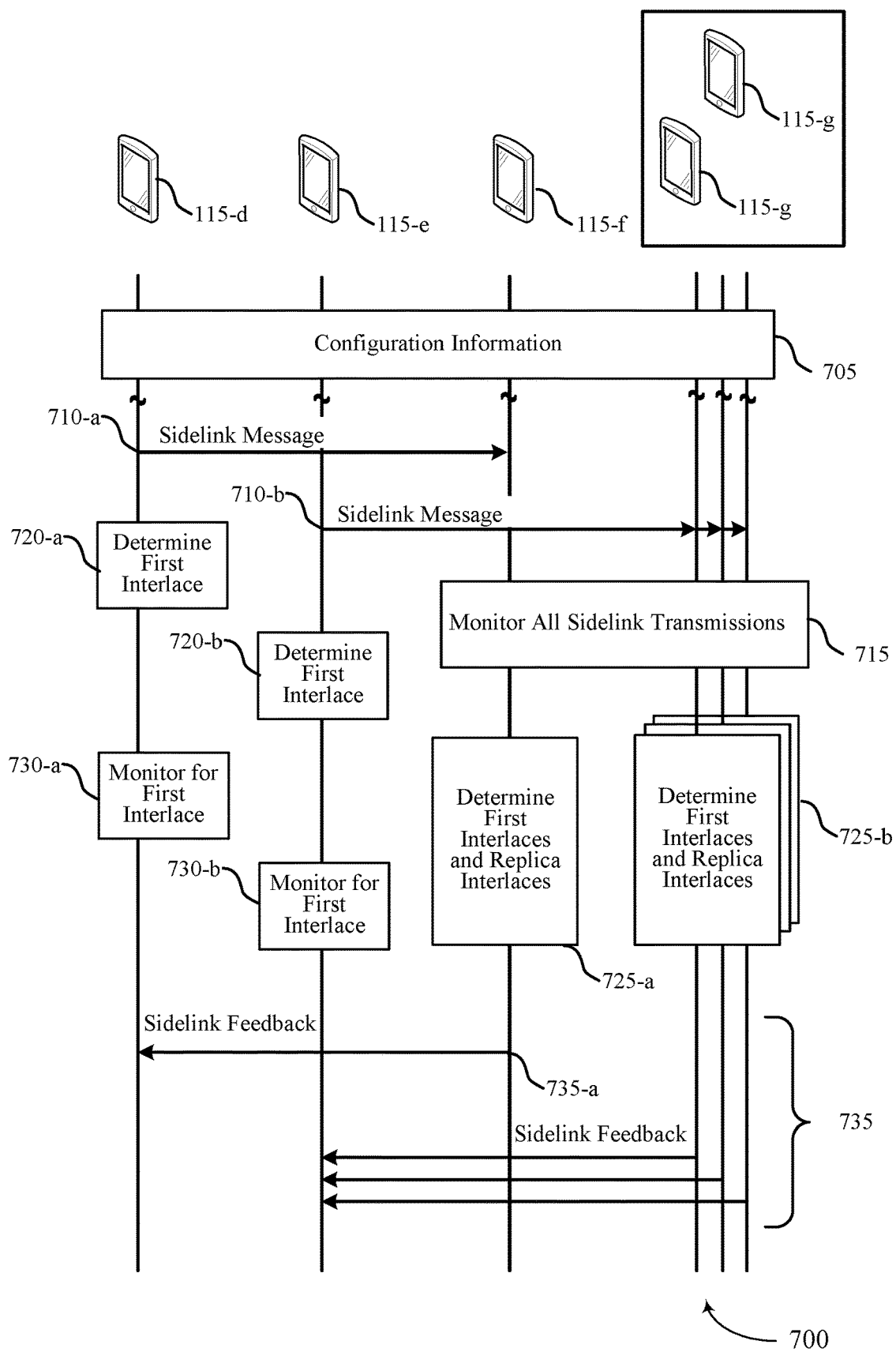
FIG. 7 illustrates an example of a process flow that supports interlaced feedback for sidelink communications via unlicensed channels in accordance with one or more aspects of the present disclosure.

FIG. 7 illustrates an example of a process flow 700 that supports interlaced feedback for sidelink communications via unlicensed channel in accordance with one or more aspects of the present disclosure. Process flow 700 may implement, or be implemented by, aspects of wireless communications system 100 and wireless communication system 200, as well as sidelink interlace feedback scheme 300, sidelink interlace feedback scheme 400, sidelink interlace feedback scheme 500, and sidelink interlace feedback scheme 600. For example, one or more UEs (e.g., the UE 115-*d*, the UE 115-*e*, the UE 115-*f* and the UEs 115-*g*) and one or more network entities (e.g., network entities 105), which may be examples of corresponding devices described with reference to FIGS. 1-6, may perform wireless communications according to the process flow 700. The UEs 115 may communicate sidelink data during one or more PSSCHs, which may be associated with a feedback symbol. The PSFCH symbol may be allocated per sets of time resources (e.g., every 1, 2, or 4 slots) within a resource pool based on pre-configuration or configuration. The UEs 115 may communicate with each other using unlicensed spectrum, such as LBT subchannel, in one or more time resources, and one or more frequency resources. The UE 115-*d* and the UE 115-*e* may be referred to as transmitting UEs, and the UE 115-*f* and the UEs 115-*g* may be referred to as receiving UEs, as described herein with reference to FIGS. 1-6.

At 705, the UEs 115 may identify configuration information. The configuration information may be preconfigured, hardcoded at the UEs 115, or indicated in one or more standards documents. In some examples, the UEs 115 may receive (e.g., from other UEs 115, or from a network entity 105, configuration information indicating parameters for the interlace mapping rule and replication rule, and interlace mapping and replication may be based on the parameters respectively. The parameters may include an offset value (e.g., a replication distance) indicating a quantity of frequency resources of the sidelink feedback symbol between a first set of sidelink feedback resources (e.g., a first or initial interlace for a given sidelink message) and the second set of sidelink feedback resources of the sidelink feedback symbol (e.g., a replica interlace for the same sidelink message). Thus, the UEs 115 may be preconfigured or configured with sidelink unlicensed (SLU) configuration information (e.g., as indicated by a configuration parameter or information element, such as SLU configuration). The configuration information may include parameters related to IRB (e.g., a number of PRBs), a first interlace configuration (e.g., z contiguous or non-contiguous PRBs in a given interlace group), replica configuration (e.g., a distance in PRBs or IRBs for replication of interlaces), or any combination thereof.

At Transmitting UEs 115 may transmit sidelink communication. For example, at 710-*a*, the UE 115-*d* may transmit a sidelink message (e.g., a unicast message having ID=0 or a groupcast type 1 message having ID=0, as described herein, on a first PSSCH 0). At 710-*b*, the transmitting UE 115-*e* may transmit a sidelink message, such as a groupcast type 2 message (e.g., having ID=1 as described herein, on a second PSSCH 1).

At 715, each receiving UE (e.g., the UE 115-*f* and any number of receiving UEs 115-*g*) may monitor all sidelink transmissions that are associated with a common PSFCH symbol (e.g., sidelink transmissions via PSSCH 0 and PSSCH 1 at 710). For instance, the UE 115-*f* may monitor for and detect the sidelink message transmitted at 710-*b*, even if the groupcast type 2 sidelink message is addressed to sidelink UEs 115-*g*, and is not addressed to the UE 115-*f*.

At 720-*a*, the UE 115-*d* may determine a first interlace for receiving sidelink feedback form the UE 115-*f* associated with the sidelink message transmitted at 710-*a*. At 720-*b*. The UE 115-*e* may determine one or more first interlaces associated with sidelink feedback for the sidelink message transmitted at 710-*b*. At 730-*a* and 730-*b*, the UE 115-*d* and the UE 115-*e*, respectively, may monitor the identified first interlaces for feedback signaling from the UE 115-*f* and the UEs 115-*g*, respectively.

At 725, the receiving UEs 115 may determine first interlaces for detected sidelink messages (e.g., sidelink transmissions via PSSCH 0 and PSSCH 1 at 710). For example, as described herein, at 725-*a*, the UE 115-*f* may map a set of sidelink feedback resources for a first interlace for each sidelink feedback associated with the detected sidelink transmissions respectively (e.g., sidelink transmissions via PSSCH 0 and PSSCH 1 at 710) according to the interlace mapping rule, and a cast type of the detected sidelink messages. The UE 115-*f* may generate sidelink feedback for transmission on the first sidelink interlace (e.g., one or more contiguous or noncontiguous PRBs in a given group of sidelink interlaces) associated with the transmission addressed to it (e.g., sidelink transmission at 710*a* via PSSCH0). Similarly, at 725-*b*, each of the UEs 115-*g* may map a set of sidelink feedback resources for a first interlace for each sidelink feedback associated with the detected sidelink transmissions respectively (e.g., sidelink transmissions via PSSCH 0 and PSSCH 1 at 710) according to the mapping rule. The UE 115-*e* may further map an interlace as replica interlace of its first interlace for sidelink feedback associated with the sidelink message 710-*a* to the feedback symbol (e.g., based on determining whether a first interlace for sidelink feedback from any UE is occupying the interlace mapped for the replicas interlace). Similarly, each of the UEs 115-*g* may further map an interlace as replica interlace of its first interlace for sidelink feedback associated with the sidelink message 710-*b* to the feedback symbol (e.g., based on determining whether a first interlace for sidelink feedback from any UE is occupying the interlace mapped for the replicas interlace).

At 725, each of the receiving UEs 115 may determine whether to allocate a second set of sidelink feedback resources for a second interlace as a replica of a first (e.g., initial) interlace of the one or more interlaces for the sidelink feedback associated with a first sidelink message based on whether the replica of the first interlace associated with the first sidelink message overlaps with a first interlace for sidelink feedback associated with a second sidelink message of the one or more sidelink messages. For example, The UE 115-*f* may allocate a second set of sidelink feedback resources for a second interlace as a replica of the first interlace associated with the sidelink message received at 710-*a*. If the replica interlace overlaps with sidelink feedback resources for a first (e.g., initial) interlace for the sidelink message detected at 710-*b* (e.g., for the UEs 115-*g*), then the UE 115-*f* may refrain from replicating feedback message for the sidelink message received at 710-*a* in the replica interlace. However, if the replica interlace is unoccupied by a first interlace for another sidelink message, then the UE 115-*e* may allocate the replica interlace for replicating sidelink feedback for the sidelink message received at 710-*a*. If the replica interlace is occupied by another replica interlace (e.g., by the UEs 115-*g*), then the UE 115-*f* may still transmit the feedback signaling for the sidelink message received at 710-*a* in both an initial interlace and the replica interlace at the PSFCH symbol. Similarly, a first UE of UEs 115-*g* may allocate a second set of sidelink feedback resources for a second interlace as a replica of the first interlace associated with the sidelink message received at 710-*b*. If the replica interlace overlaps with sidelink feedback resources for a first (e.g., initial) interlace for the sidelink message detected at 710-*a* (e.g., for the UE 115-*f*) or detected at 710-*b* (e.g., for a second UE of the UEs 115-*g*), then the first UE of the UEs 115-*g* may refrain from replicating feedback message for the sidelink message received at 710-*b* in the replica interlace. However, if the replica interlace is unoccupied by a first interlace for another sidelink message at 710-*a* or by a first interlace for any second UE of UEs 150-*g* for same sidelink message at 710-*b*, then the first UE of the UEs 115-*g* may allocate the replica interlace for replicating sidelink feedback for the sidelink message received at 710-*b*. If the replica interlace is occupied by another replica interlace (e.g., by the UE 115-*f* or any second UE of UEs 115-*g*), then the first UE of UEs 115-*g* may still transmit the feedback signaling for the sidelink message received at 710-*b* in both an initial interlace and the replica interlace at the PSFCH symbol.

At 735, each receiving UE may transmit a first interlace (e.g., carrying HARQ feedback with ACK or NACK) for any received sidelink message addressed to the respective receiving UE. Additionally, each receiving UE 115 may transmit one or more replicas if any are interlaced onto the PSFCH symbol. For example, the UE 115-*f* and the UEs 115-*g* may transmit feedback information, all of which may be interlaced over the PSFCH symbol such as to satisfy a threshold OCB condition. The UE 115-*f* may transmit (e.g., at 735-*a*) a feedback message for the sidelink message received at 710-*a*, and may transmit the feedback message via the first interlace, and any replica interlaces that are not occupied by an first interlace for the UEs 115-*g*. Similarly, the UEs 115-*g* may transmit feedback messages for the sidelink message received at 710-*b* via respective first interlaces determined at 725-*b*. The UEs 115-*g* may also transmit sidelink feedback via any replica interlaces that are not occupied by another first interlace for sidelink signaling detected at 710 (e.g., sidelink message at 710-*a* and sidelink message at 710-*b*).

Figure 8:
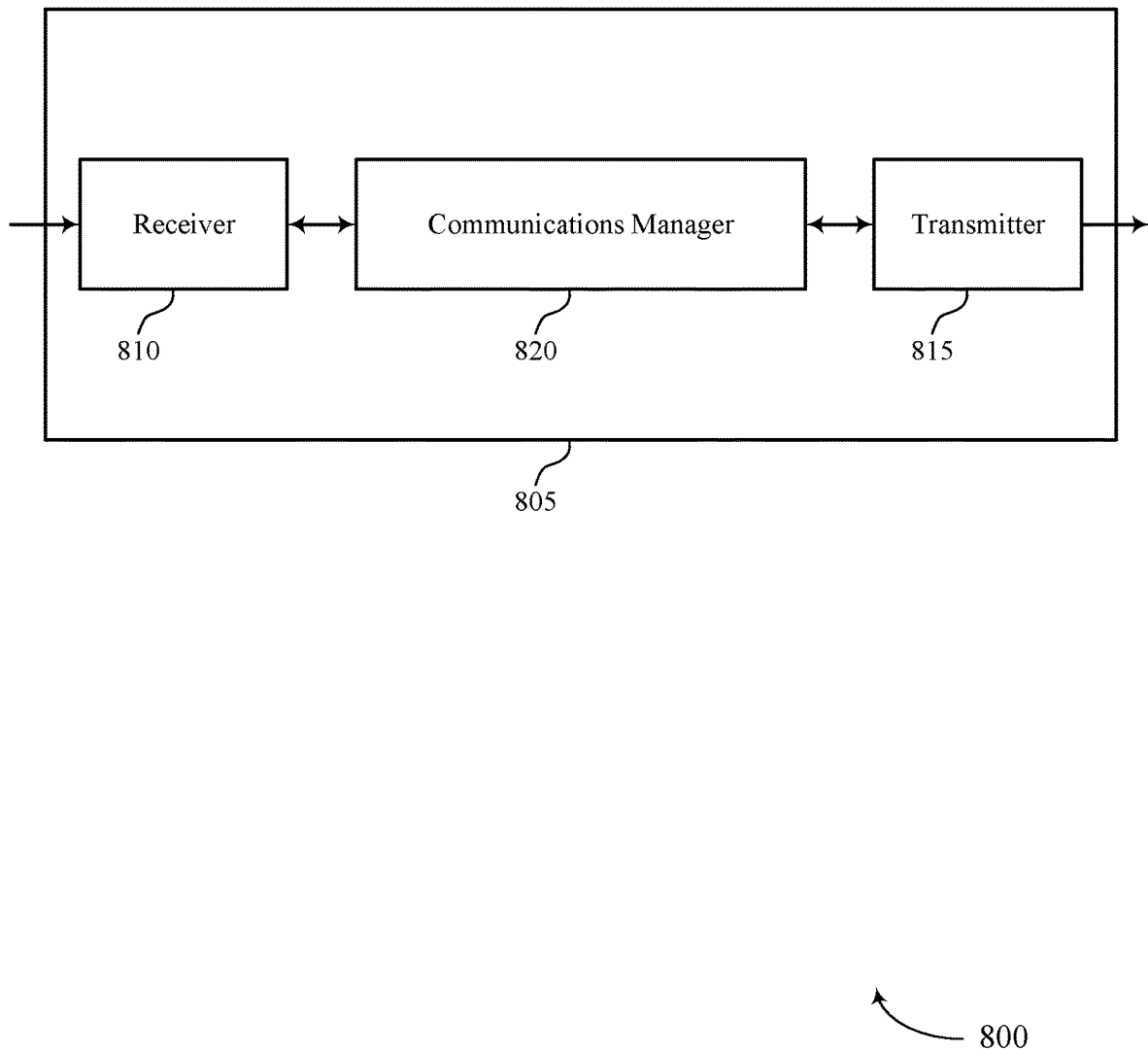
FIGS. 8 and 9 show block diagrams of devices that support interlaced feedback for sidelink communications via unlicensed channels in accordance with one or more aspects of the present disclosure.

FIG. 8 shows a block diagram 800 of a device 805 that supports interlaced feedback for sidelink communications via unlicensed channel in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to interlaced feedback for sidelink communications via unlicensed resources). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to interlaced feedback for sidelink communications via unlicensed resources). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of interlaced feedback for sidelink communications via unlicensed channel as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. For example, the communications manager 820 may be configured as or otherwise support a means for detecting one or more sidelink messages on an unlicensed channel, the one or more sidelink messages sharing a common sidelink feedback symbol. The communications manager 820 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The communications manager 820 may be configured as or otherwise support a means for determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The communications manager 820 may be configured as or otherwise support a means for transmitting, during the sidelink feedback symbol, sidelink feedback associated with the first sidelink message via the first interlace according to the mapping and based on the determining.

Additionally, or alternatively, the communications manager 820 may support wireless communications at a UE in accordance with examples as disclosed herein. For example, the communications manager 820 may be configured as or otherwise support a means for transmitting one or more sidelink messages on an unlicensed channel, the one or more sidelink messages sharing a common sidelink feedback symbol. The communications manager 820 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The communications manager 820 may be configured as or otherwise support a means for receiving, during the sidelink feedback symbol, a sidelink feedback associated with a first sidelink message of the one or more sidelink messages via the first interlace according to the mapping.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for sidelink feedback signaling resulting in more reliable feedback signaling, improved reliability of sidelink communications, improved throughput, more efficient use of available sidelink resources, decreased system latency, decreased interference, and improved user experience.

Figure 9:
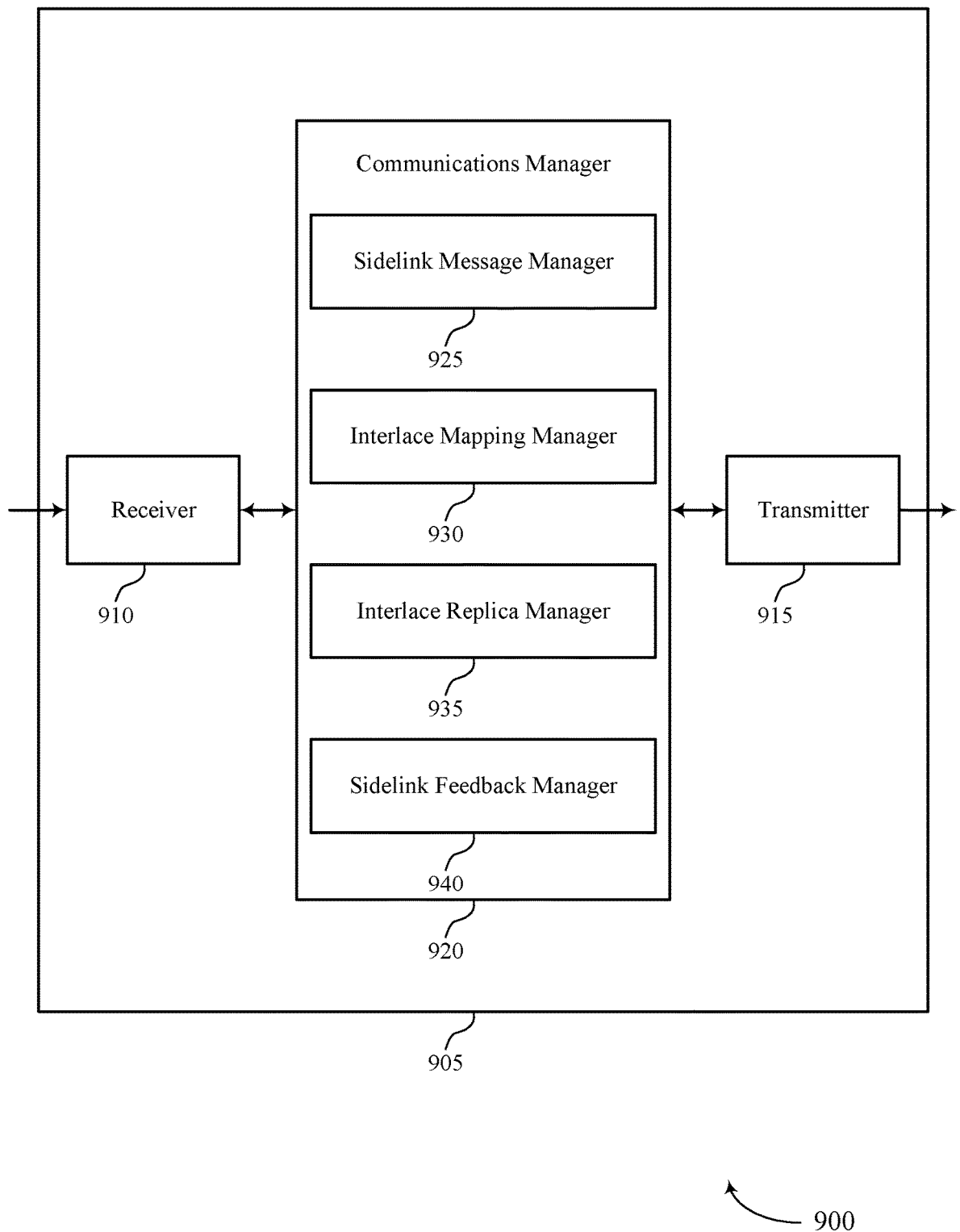

FIG. 9 shows a block diagram 900 of a device 905 that supports interlaced feedback for sidelink communications via unlicensed channel in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to interlaced feedback for sidelink communications via unlicensed resources). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to interlaced feedback for sidelink communications via unlicensed resources). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of interlaced feedback for sidelink communications via unlicensed channel as described herein. For example, the communications manager 920 may include a sidelink message manager 925, an interlace mapping manager 930, an interlace replica manager 935, a sidelink feedback manager 940, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a UE in accordance with examples as disclosed herein. The sidelink message manager 925 may be configured as or otherwise support a means for detecting one or more sidelink messages on an unlicensed channel, the one or more sidelink messages sharing a common sidelink feedback symbol. The interlace mapping manager 930 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The interlace replica manager 935 may be configured as or otherwise support a means for determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The sidelink feedback manager 940 may be configured as or otherwise support a means for transmitting, during the sidelink feedback symbol, sidelink feedback associated with the first sidelink message via the first interlace according to the mapping and based on the determining.

Additionally, or alternatively, the communications manager 920 may support wireless communications at a UE in accordance with examples as disclosed herein. The sidelink message manager 925 may be configured as or otherwise support a means for transmitting one or more sidelink messages on an unlicensed channel, the one or more sidelink messages sharing a common sidelink feedback symbol. The interlace mapping manager 930 may be configured as or otherwise support a means for mapping respective sets of sidelink feedback resources for each of the one or more sidelink messages to respective interlaces of one or more interlaces of sidelink resources of the sidelink feedback symbol according to an interlace mapping rule associated with sidelink feedback signaling, the respective sets of sidelink feedback resources including a first set of sidelink feedback resources for a first sidelink message of the one or more sidelink messages. The sidelink feedback manager 940 may be configured as or otherwise support a means for receiving, during the sidelink feedback symbol, a sidelink feedback associated with a first sidelink message of the one or more sidelink messages via the first interlace according to the mapping.

Figure 10:
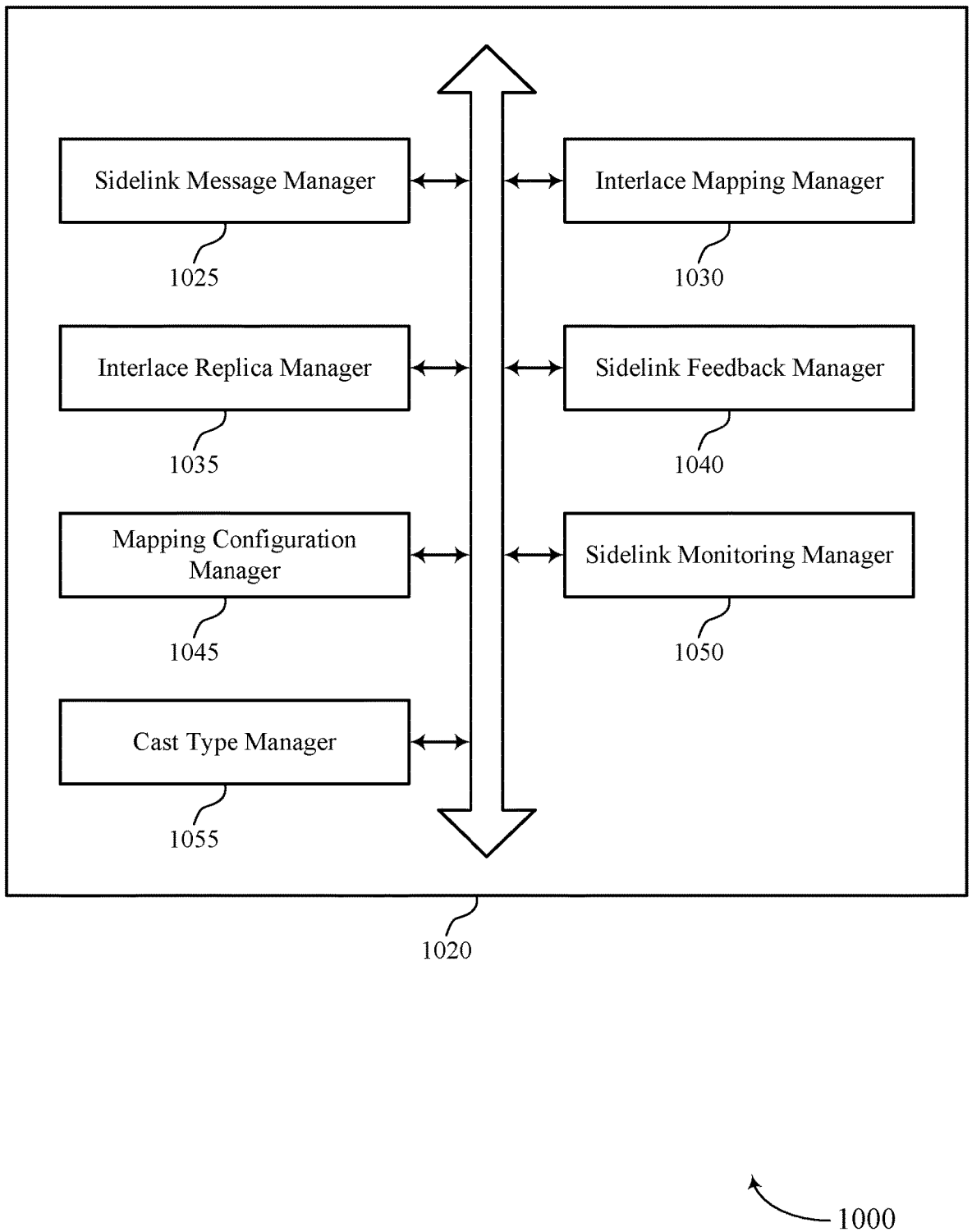
FIG. 10 shows a block diagram of a communications manager that supports interlaced feedback for sidelink communications via unlicensed channels in accordance with one or more aspects of the present disclosure.

FIG. 10 shows a block diagram 1000 of a communications manager 1020 that supports interlaced feedback for sidelink communications via unlicensed channel in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of interlaced feedback for sidelink communications via unlicensed channel as described herein. For example, the communications manager 1020 may include a sidelink message manager 1025, an interlace mapping manager 1030, an interlace replica manager 1035, a sidelink feedback manager 1040, a mapping configuration manager 1045, a sidelink monitoring manager 1050, a cast type manager 1055, or any combination thereof. Each of these components may communicate, directly or indirectly, with one another (e.g., via one or more buses).

The communications manager 1020 may support wireless communications at a UE in accordance with examples as disclosed herein. The sidelink message manager 1025 may be configured as or otherwise support a means for detecting one or more sidelink messages on an unlicensed channel, the one or more sidelink messages sharing a common sidelink feedback symbol. The interlace mapping manager 1030 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The interlace replica manager 1035 may be configured as or otherwise support a means for determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The sidelink feedback manager 1040 may be configured as or otherwise support a means for transmitting, during the sidelink feedback symbol, sidelink feedback associated with the first sidelink message via the first interlace according to the mapping and based on the determining.

In some examples, the interlace replica manager 1035 may be configured as or otherwise support a means for transmitting, during the sidelink feedback symbol, the sidelink feedback associated with the first sidelink message via the replica of the first interlace based on the determining, where the replica of the first interlace for the sidelink feedback associated with the first sidelink message is not overlapping with the additional first interlace for the sidelink feedback associated with the second sidelink message.

In some examples, the interlace mapping manager 1030 may be configured as or otherwise support a means for mapping the replica of the first interlace for the sidelink feedback associated with the first sidelink message to a second set of sidelink feedback resources of the sidelink feedback symbol according to a replica mapping rule, where the determining is based on the mapping.

In some examples, the replica mapping rule includes an offset value indicating a quantity of frequency resources of the sidelink feedback symbol between the first set of sidelink feedback resources and the second set of sidelink feedback resources of the sidelink feedback symbol.

In some examples, the first interlace and the replica of the first interlace for the sidelink feedback associated with the first sidelink message satisfy a channel occupancy threshold for the sidelink feedback symbol on the unlicensed channel.

In some examples, the interlace replica manager 1035 may be configured as or otherwise support a means for refraining from transmitting the replica of the first interlace for the sidelink feedback associated with the first sidelink message via the second set of sidelink feedback resources of the sidelink feedback symbol based on the determining, where the second set of sidelink feedback resources of the sidelink feedback symbol is occupied by the additional first interlace for the sidelink feedback associated with the second sidelink message.

In some examples, the sidelink feedback satisfies a channel occupancy threshold for the sidelink feedback symbol on the unlicensed channel.

In some examples, the mapping configuration manager 1045 may be configured as or otherwise support a means for receiving configuration information including parameters for at least the interlace mapping rule, a replica mapping rule, or both where the mapping is based on the parameters.

In some examples, the sidelink monitoring manager 1050 may be configured as or otherwise support a means for monitoring the unlicensed channel for the one or more sidelink messages, where the detecting is based on the monitoring, and where at least one of the one or more sidelink messages are addressed to one or more additional UEs.

In some examples, the mapping is based on the interlace mapping rule and a cast type of the first sidelink message.

In some examples, to support transmitting the sidelink feedback, the cast type manager 1055 may be configured as or otherwise support a means for transmitting a sidelink feedback message associated with the first sidelink message via a first set of a set of multiple physical resource blocks for the first interlace for sidelink feedback, the sidelink feedback message including an acknowledgement message or a negative acknowledgement message, where the first sidelink message includes a unicast cast type addressed to the UE.

In some examples, to support transmitting the sidelink feedback, the cast type manager 1055 may be configured as or otherwise support a means for transmitting a sidelink feedback message associated with the first sidelink message via a first set of a set of multiple physical resource blocks for the first interlace for sidelink feedback, the sidelink feedback message including a negative acknowledgement message indicating that the UE failed to decode the first sidelink message, where the first sidelink message includes a multicast cast type addressed to a set of multiple UEs including the UE, and where the first set of the set of multiple physical resource block is allocated to the set of multiple UEs, according to the interlace mapping rule, for transmitting the sidelink feedback.

In some examples, to support transmitting the sidelink feedback, the cast type manager 1055 may be configured as or otherwise support a means for transmitting a sidelink feedback message associated with the first sidelink message via a first set of a set of multiple physical resource blocks for the first interlace for sidelink feedback, the sidelink feedback message including an acknowledgement message or a negative acknowledgement message, where the first sidelink message includes a multicast cast type addressed to a set of multiple UEs including the UE, and where the first set of the set of multiple physical resource blocks of the first interlace is allocated to each UE of the set of multiple UEs, according to the interlace mapping rule, for transmitting the sidelink feedback.

In some examples, the first interlace for sidelink feedback includes a set of multiple physical resource blocks that are contiguous in frequency. In some examples, the first interlace for sidelink feedback includes a set of multiple physical resource blocks that are not contiguous in frequency. In some examples, the first interlace for sidelink feedback includes a set of multiple respective physical resource blocks that are associated with a single cyclic shift. In some examples, the first interlace for sidelink feedback includes a set of multiple respective physical resource blocks that are associated with a set of multiple cyclic shifts.

Additionally, or alternatively, the communications manager 1020 may support wireless communications at a UE in accordance with examples as disclosed herein. In some examples, the sidelink message manager 1025 may be configured as or otherwise support a means for transmitting one or more sidelink messages on an unlicensed channel, the one or more sidelink messages sharing a common sidelink feedback symbol. In some examples, the interlace mapping manager 1030 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. In some examples, the sidelink feedback manager 1040 may be configured as or otherwise support a means for receiving, during the sidelink feedback symbol, a sidelink feedback associated with a first sidelink message of the one or more sidelink messages via the first interlace according to the mapping.

In some examples, the mapping configuration manager 1045 may be configured as or otherwise support a means for receiving configuration information including parameters for at least the interlace mapping rule, a replica mapping rule, or both, where the mapping is based on the parameters.

In some examples, the interlace mapping manager 1030 may be configured as or otherwise support a means for mapping the first set of sidelink feedback resources for the first interlace for each sidelink feedback associated with the one or more sidelink messages based on the interlace mapping rule and a cast type of the first sidelink message. In some examples, the sidelink monitoring manager 1050 may be configured as or otherwise support a means for monitoring the first interlace for each sidelink feedback associated with the one or more sidelink messages based on the mapping, where receiving the sidelink feedback associated with the first sidelink message is based on the monitoring.

In some examples, to support receiving the sidelink feedback, the cast type manager 1055 may be configured as or otherwise support a means for receiving a sidelink feedback message associated with the first sidelink message via a first set of a set of multiple physical resource blocks for the first interlace for sidelink feedback, the sidelink feedback message including an acknowledgement message or a negative acknowledgement message, where the first sidelink message includes a unicast cast type.

In some examples, to support receiving the sidelink feedback, the cast type manager 1055 may be configured as or otherwise support a means for receiving at least one sidelink feedback message associated with the first sidelink message via a first set of multiple physical resource blocks for the first interlace for sidelink feedback, the sidelink feedback message including a negative acknowledgement message indicating that at least one of a set of multiple UEs failed to decode the first sidelink message, where the first sidelink message includes a multicast cast type addressed to the set of multiple UEs, and where the first set of the physical resource block is allocated to the set of multiple UEs, according to the interlace mapping rule, for transmitting the sidelink feedback.

In some examples, to support receiving the sidelink feedback, the cast type manager 1055 may be configured as or otherwise support a means for receiving a sidelink feedback message associated with the first sidelink message via a first set of a set of multiple physical resource blocks for the first interlace for sidelink feedback, the sidelink feedback message including an acknowledgement message or a negative acknowledgement message, where the first sidelink message includes a multicast cast type addressed to a set of multiple UEs, and where the first set of the set of multiple physical resource blocks are allocated to a respective UE of the set of multiple UEs, according to the interlace mapping rule, for transmitting the sidelink feedback.

In some examples, the first interlace for sidelink feedback includes a set of multiple physical resource blocks that are contiguous in frequency. In some examples, the first interlace for sidelink feedback includes a set of multiple physical resource blocks that are not contiguous in frequency. In some examples, the first interlace for sidelink feedback includes a set of multiple respective physical resource blocks that are associated with a single cyclic shift. In some examples, the first interlace for sidelink feedback includes a set of multiple respective physical resource blocks that are associated with a set of multiple cyclic shifts.

Figure 11:
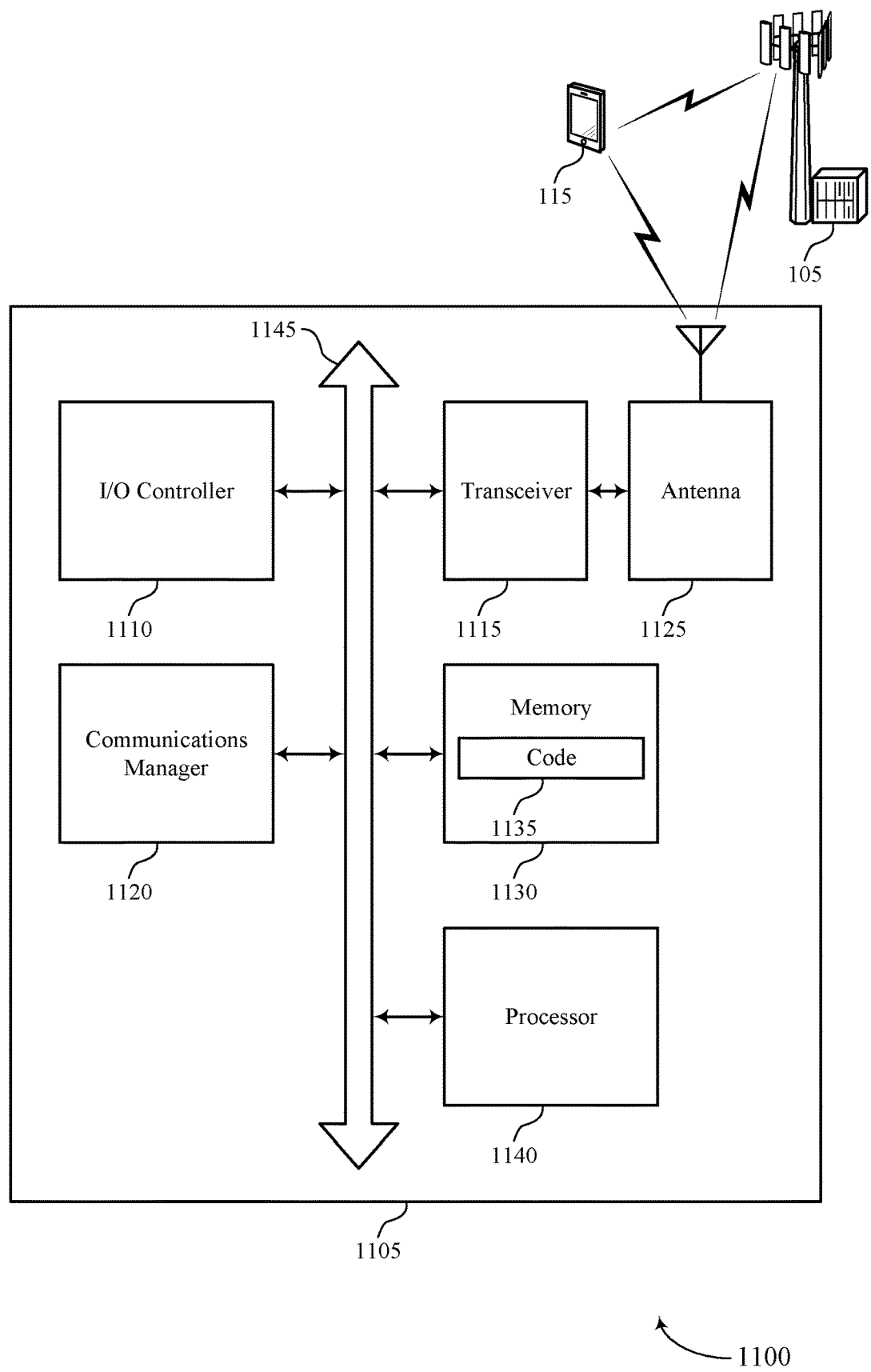
FIG. 11 shows a diagram of a system including a device that supports interlaced feedback for sidelink communications via unlicensed channels in accordance with one or more aspects of the present disclosure.

FIG. 11 shows a diagram of a system 1100 including a device 1105 that supports interlaced feedback for sidelink communications via unlicensed channel in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting interlaced feedback for sidelink communications via unlicensed resources). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for detecting one or more sidelink messages on an unlicensed channel, the one or more sidelink messages sharing a common sidelink feedback symbol. The communications manager 1120 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The communications manager 1120 may be configured as or otherwise support a means for determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The communications manager 1120 may be configured as or otherwise support a means for transmitting, during the sidelink feedback symbol, sidelink feedback associated with the first sidelink message via the first interlace according to the mapping and based on the determining.

Additionally, or alternatively, the communications manager 1120 may support wireless communications at a UE in accordance with examples as disclosed herein. For example, the communications manager 1120 may be configured as or otherwise support a means for transmitting one or more sidelink messages on an unlicensed channel, the one or more sidelink messages sharing a common sidelink feedback symbol. The communications manager 1120 may be configured as or otherwise support a means for mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The communications manager 1120 may be configured as or otherwise support a means for receiving, during the sidelink feedback symbol, a sidelink feedback associated with a first sidelink message of the one or more sidelink messages via the first interlace according to the mapping.

By including or configuring the communications manager 1120 in accordance with examples as described herein, the device 1105 may support techniques for sidelink feedback signaling resulting in more reliable feedback signaling, improved reliability of sidelink communications, improved throughput, more efficient use of available sidelink resources, decreased system latency, decreased interference, and improved user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of interlaced feedback for sidelink communications via unlicensed channel as described herein, or the processor 1140 and the memory 1130 may be otherwise configured to perform or support such operations.

Figure 12:
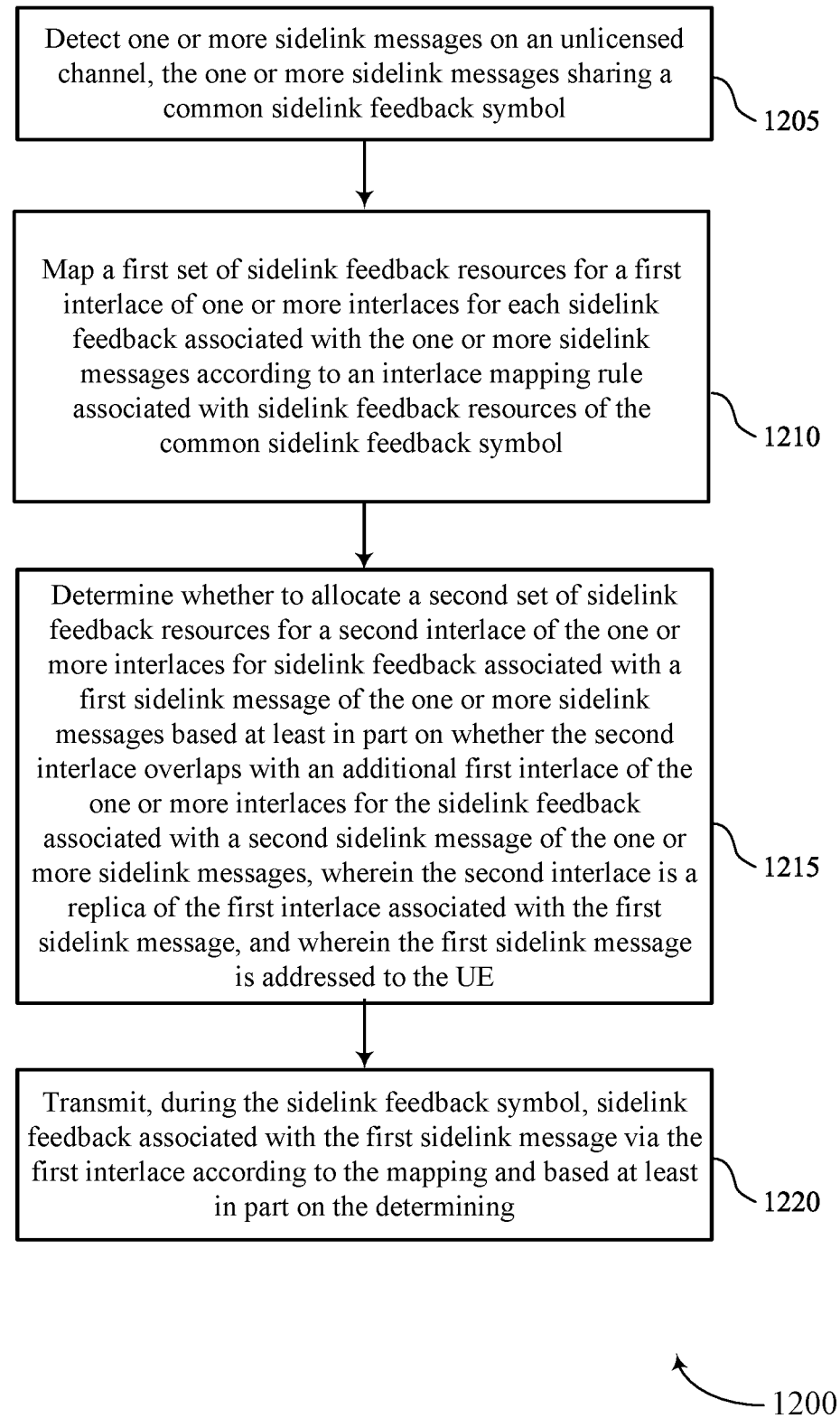
FIGS. 12 through 17 show flowcharts illustrating methods that support interlaced feedback for sidelink communications via unlicensed channels in accordance with one or more aspects of the present disclosure.

FIG. 12 shows a flowchart illustrating a method 1200 that supports interlaced feedback for sidelink communications via unlicensed channel in accordance with one or more aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include detecting one or more sidelink messages on an unlicensed channel, the one or more sidelink messages sharing a common sidelink feedback symbol. The operations of 1205 may be performed in accordance with examples as disclosed herein. In some examples, aspects of the operations of 1205 may be performed by a sidelink message manager 1025 as described with reference to FIG. 10.

At 1210, the method may include mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The operations of 1210 may be performed in accordance with examples as disclosed herein. In some examples, aspects of the operations of 1210 may be performed by an interlace mapping manager 1030 as described with reference to FIG. 10.

At 1215, the method may include determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The operations of 1215 may be performed in accordance with examples as disclosed herein. In some examples, aspects of the operations of 1215 may be performed by an interlace replica manager 1035 as described with reference to FIG. 10.

At 1220, the method may include transmitting, during the sidelink feedback symbol, sidelink feedback associated with the first sidelink message via the first interlace according to the mapping and based on the determining. The operations of 1220 may be performed in accordance with examples as disclosed herein. In some examples, aspects of the operations of 1220 may be performed by a sidelink feedback manager 1040 as described with reference to FIG. 10.

Figure 13:
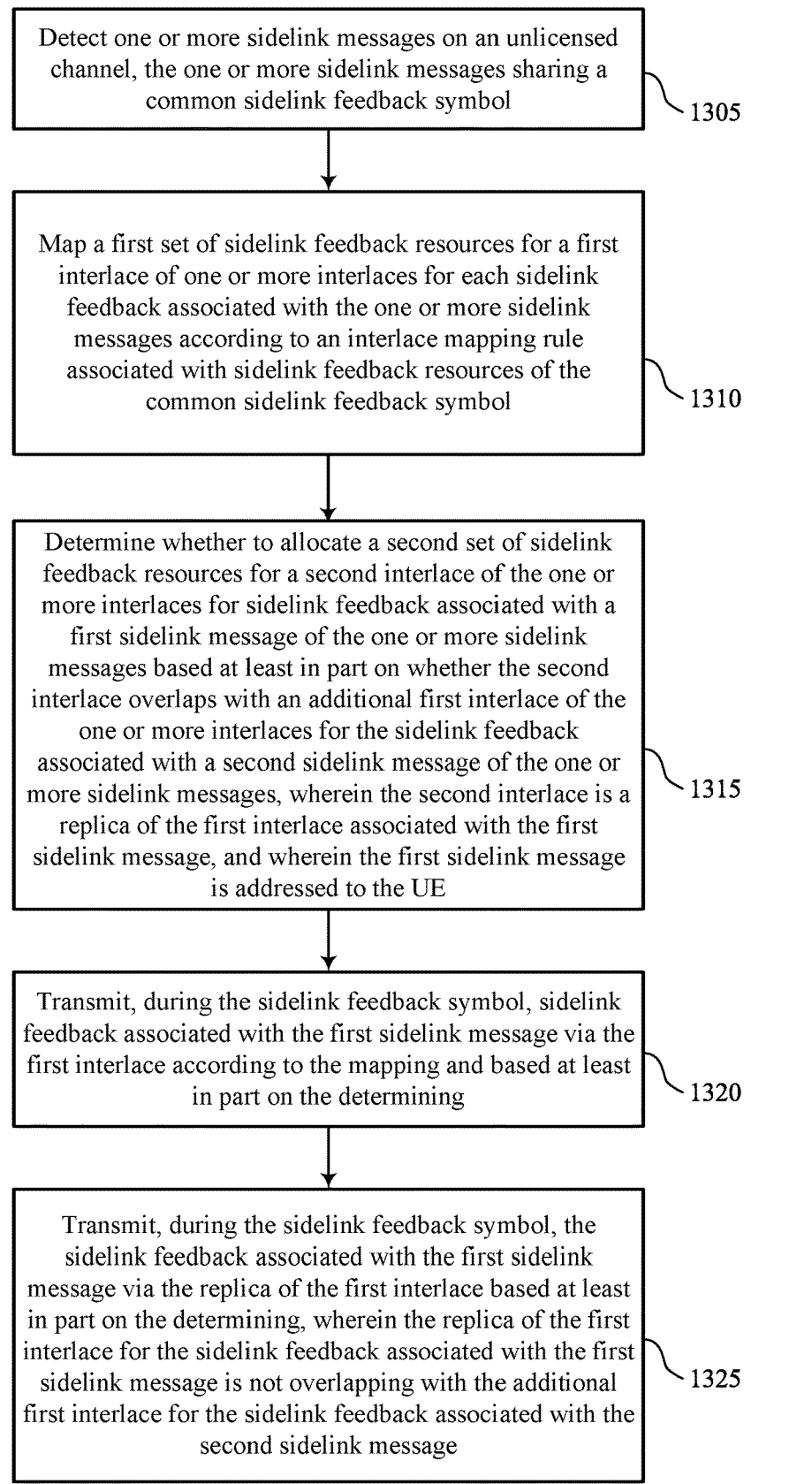

FIG. 13 shows a flowchart illustrating a method 1300 that supports interlaced feedback for sidelink communications via unlicensed channel in accordance with one or more aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include detecting one or more sidelink messages on an unlicensed channel, the one or more sidelink messages sharing a common sidelink feedback symbol. The operations of 1305 may be performed in accordance with examples as disclosed herein. In some examples, aspects of the operations of 1305 may be performed by a sidelink message manager 1025 as described with reference to FIG. 10.

At 1310, the method may include mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The operations of 1310 may be performed in accordance with examples as disclosed herein. In some examples, aspects of the operations of 1310 may be performed by an interlace mapping manager 1030 as described with reference to FIG. 10.

At 1315, the method may include determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The operations of 1315 may be performed in accordance with examples as disclosed herein. In some examples, aspects of the operations of 1315 may be performed by an interlace replica manager 1035 as described with reference to FIG. 10.

At 1320, the method may include transmitting, during the sidelink feedback symbol, sidelink feedback associated with the first sidelink message via the first interlace according to the mapping and based on the determining. The operations of 1320 may be performed in accordance with examples as disclosed herein. In some examples, aspects of the operations of 1320 may be performed by a sidelink feedback manager 1040 as described with reference to FIG. 10.

At 1325, the method may include transmitting, during the sidelink feedback symbol, the sidelink feedback associated with the first sidelink message via the replica of the first interlace based on the determining, where the replica of the first interlace for the sidelink feedback associated with the first sidelink message is not overlapping with the additional first interlace for the sidelink feedback associated with the second sidelink message. The operations of 1325 may be performed in accordance with examples as disclosed herein. In some examples, aspects of the operations of 1325 may be performed by an interlace replica manager 1035 as described with reference to FIG. 10.

Figure 14:
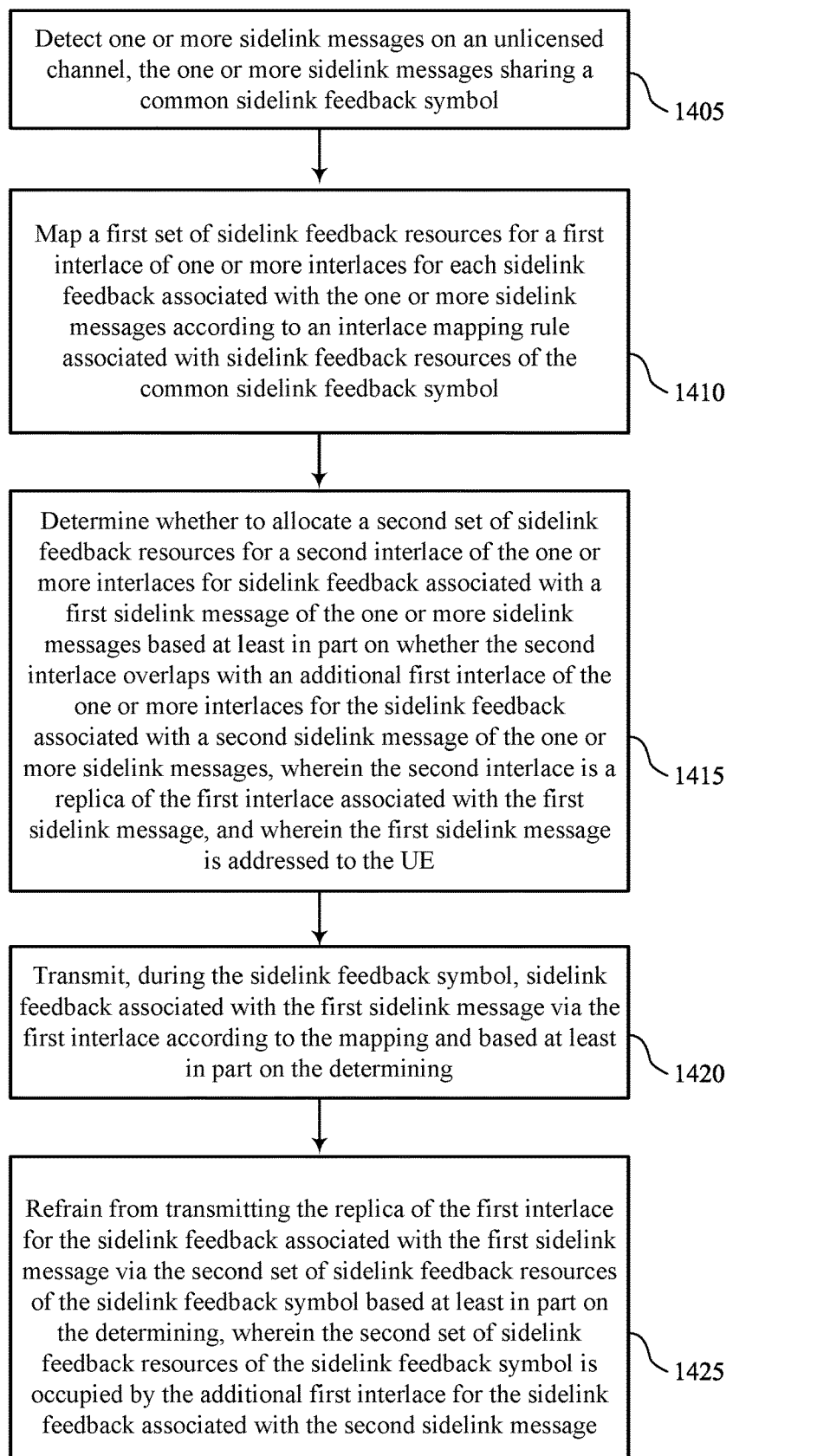

FIG. 14 shows a flowchart illustrating a method 1400 that supports interlaced feedback for sidelink communications via unlicensed channel in accordance with one or more aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include detecting one or more sidelink messages on an unlicensed channel, the one or more sidelink messages sharing a common sidelink feedback symbol. The operations of 1405 may be performed in accordance with examples as disclosed herein. In some examples, aspects of the operations of 1405 may be performed by a sidelink message manager 1025 as described with reference to FIG. 10.

At 1410, the method may include mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The operations of 1410 may be performed in accordance with examples as disclosed herein. In some examples, aspects of the operations of 1410 may be performed by an interlace mapping manager 1030 as described with reference to FIG. 10.

At 1415, the method may include determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The operations of 1415 may be performed in accordance with examples as disclosed herein. In some examples, aspects of the operations of 1415 may be performed by an interlace replica manager 1035 as described with reference to FIG. 10.

At 1420, the method may include transmitting, during the sidelink feedback symbol, sidelink feedback associated with the first sidelink message via the first interlace according to the mapping and based on the determining. The operations of 1420 may be performed in accordance with examples as disclosed herein. In some examples, aspects of the operations of 1420 may be performed by a sidelink feedback manager 1040 as described with reference to FIG. 10.

At 1425, the method may include refraining from transmitting the replica of the first interlace for the sidelink feedback associated with the first sidelink message via the second set of sidelink feedback resources of the sidelink feedback symbol based on the determining, where the second set of sidelink feedback resources of the sidelink feedback symbol is occupied by the additional first interlace for the sidelink feedback associated with the second sidelink message. The operations of 1425 may be performed in accordance with examples as disclosed herein. In some examples, aspects of the operations of 1425 may be performed by an interlace replica manager 1035 as described with reference to FIG. 10.

Figure 15:
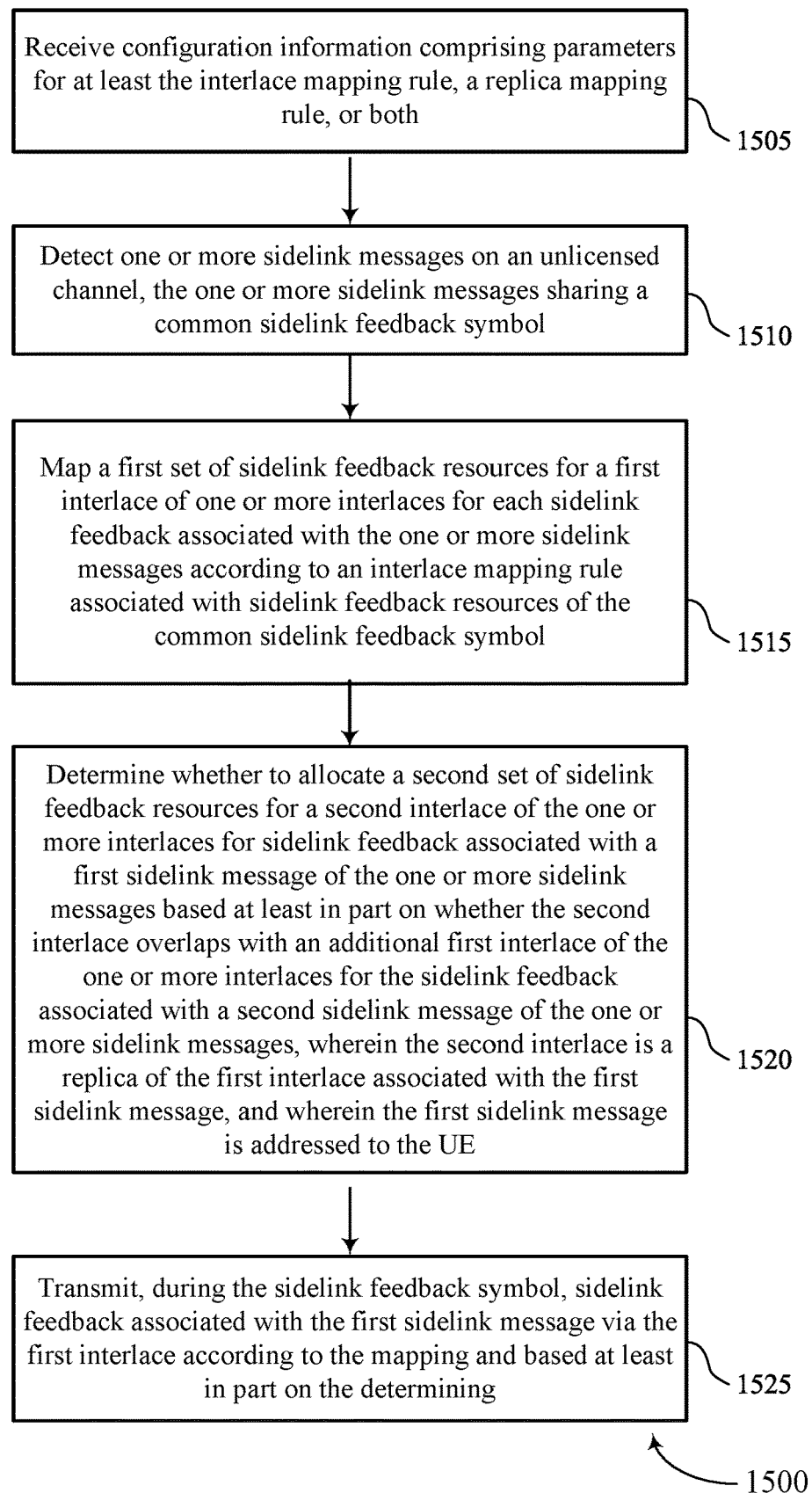

FIG. 15 shows a flowchart illustrating a method 1500 that supports interlaced feedback for sidelink communications via unlicensed channel in accordance with one or more aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include receiving configuration information including parameters for an interlace mapping, an interlace replica rule, or both. The operations of 1505 may be performed in accordance with examples as disclosed herein. In some examples, aspects of the operations of 1505 may be performed by a mapping configuration manager 1045 as described with reference to FIG. 10.

At 1510, the method may include detecting one or more sidelink messages on an unlicensed channel, the one or more sidelink messages sharing a common sidelink feedback symbol. The operations of 1510 may be performed in accordance with examples as disclosed herein. In some examples, aspects of the operations of 1510 may be performed by a sidelink message manager 1025 as described with reference to FIG. 10.

At 1515, the method may include map a first set of sidelink feedback resources for a first interlace of one or more interlaces for each sidelink feedback associated with the one or more sidelink messages according to an interlace mapping rule associated with sidelink feedback resources of the common sidelink feedback symbol, wherein the mapping is based at least in part on the parameters. The operations of 1515 may be performed in accordance with examples as disclosed herein. In some examples, aspects of the operations of 1515 may be performed by an interlace mapping manager 1030 as described with reference to FIG. 10.

At 1520, the method may include determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE. The operations of 1520 may be performed in accordance with examples as disclosed herein. In some examples, aspects of the operations of 1520 may be performed by an interlace replica manager 1035 as described with reference to FIG. 10.

At 1525, the method may include transmitting, during the sidelink feedback symbol, sidelink feedback associated with the first sidelink message via the first interlace according to the mapping and based on the determining. The operations of 1525 may be performed in accordance with examples as disclosed herein. In some examples, aspects of the operations of 1525 may be performed by a sidelink feedback manager 1040 as described with reference to FIG. 10.

Figure 16:
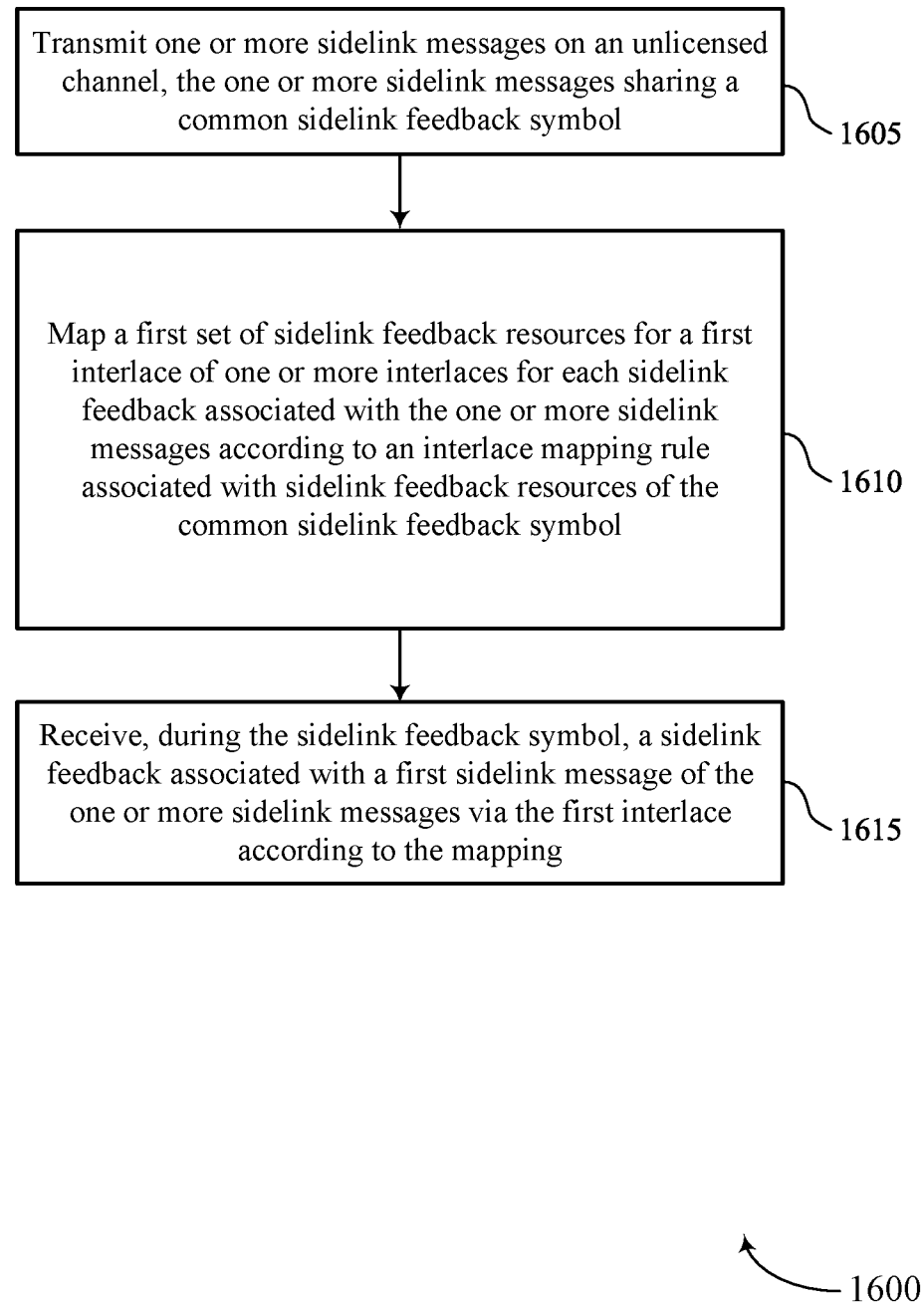

FIG. 16 shows a flowchart illustrating a method 1600 that supports interlaced feedback for sidelink communications via unlicensed channel in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting one or more sidelink messages on an unlicensed channel, the one or more sidelink messages sharing a common sidelink feedback symbol. The operations of 1605 may be performed in accordance with examples as disclosed herein. In some examples, aspects of the operations of 1605 may be performed by a sidelink message manager 1025 as described with reference to FIG. 10.

At 1610, the method may include mapping a first set of sidelink feedback resources for a first interlace of one or more interlaces for each sidelink feedback associated with the one or more sidelink messages according to an interlace mapping rule associated with sidelink feedback resources of the common sidelink feedback symbol. The operations of 1610 may be performed in accordance with examples as disclosed herein. In some examples, aspects of the operations of 1610 may be performed by an interlace mapping manager 1030 as described with reference to FIG. 10.

At 1615, the method may include receiving, during the sidelink feedback symbol, a sidelink feedback associated with a first sidelink message of the one or more sidelink messages via the first interlace according to the mapping. The operations of 1615 may be performed in accordance with examples as disclosed herein. In some examples, aspects of the operations of 1615 may be performed by a sidelink feedback manager 1040 as described with reference to FIG. 10.

Figure 17:
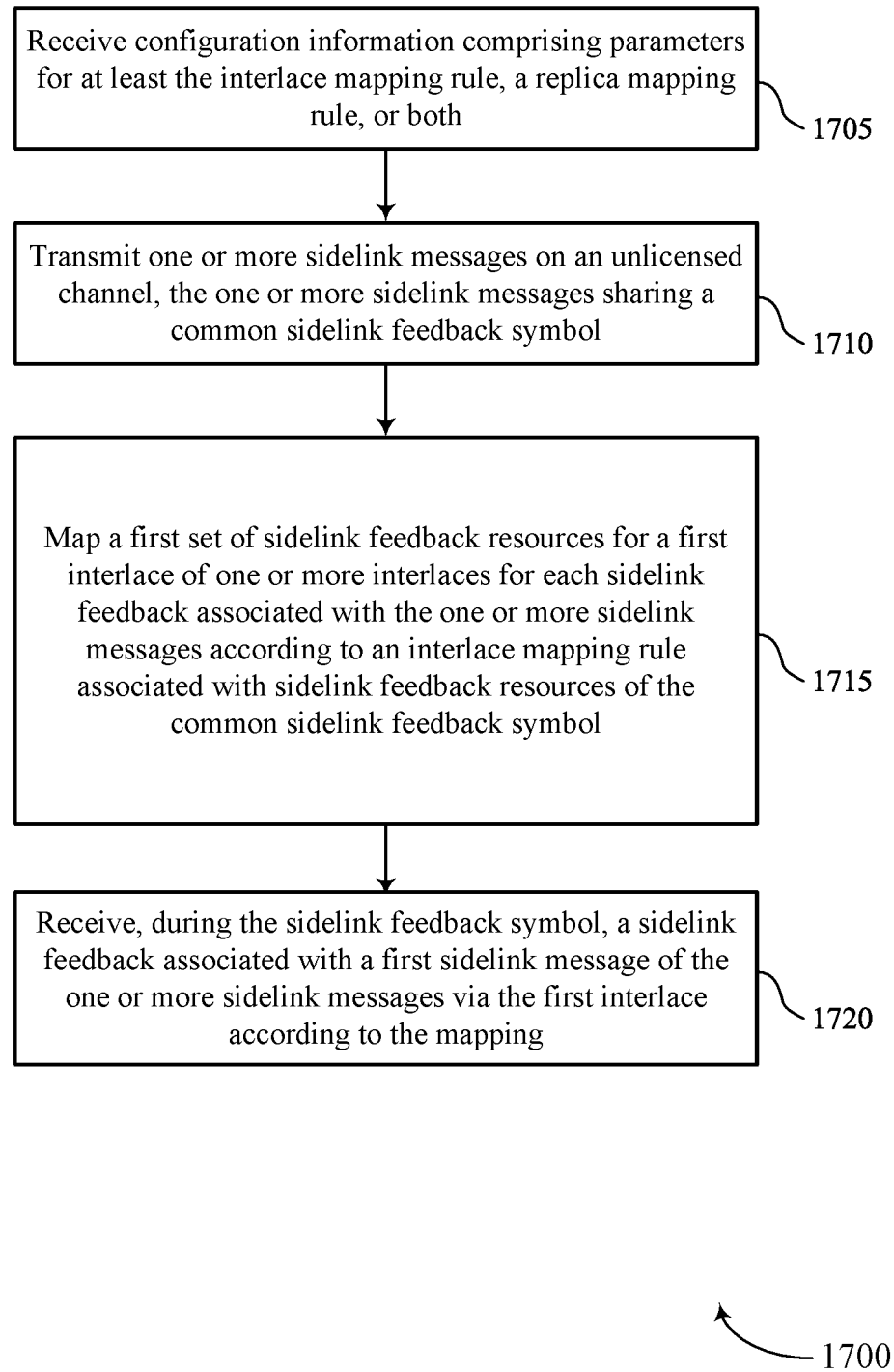

FIG. 17 shows a flowchart illustrating a method 1700 that supports interlaced feedback for sidelink communications via unlicensed channel in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving configuration information including parameters for at least an interlace mapping rule, the replica mapping rule, or both. The operations of 1705 may be performed in accordance with examples as disclosed herein. In some examples, aspects of the operations of 1705 may be performed by a mapping configuration manager 1045 as described with reference to FIG. 10.

At 1710, the method may include transmitting one or more sidelink messages on an unlicensed channel, the one or more sidelink messages sharing a common sidelink feedback symbol. The operations of 1710 may be performed in accordance with examples as disclosed herein. In some examples, aspects of the operations of 1710 may be performed by a sidelink message manager 1025 as described with reference to FIG. 10.

At 1715, the method may include mapping a first set of sidelink feedback resources for a first interlace of one or more interlaces for each sidelink feedback associated with the one or more sidelink messages according to an interlace mapping rule associated with sidelink feedback resources of the common sidelink feedback symbol, wherein the mapping is based at least in part on the parameters. The operations of 1715 may be performed in accordance with examples as disclosed herein. In some examples, aspects of the operations of 1715 may be performed by an interlace mapping manager 1030 as described with reference to FIG. 10.

At 1720, the method may include receiving, during the sidelink feedback symbol, a sidelink feedback associated with a first sidelink message of the one or more sidelink messages via the first interlace according to the mapping. The operations of 1720 may be performed in accordance with examples as disclosed herein. In some examples, aspects of the operations of 1720 may be performed by a sidelink feedback manager 1040 as described with reference to FIG. 10.

The following provides an overview of aspects of the present disclosure:

Aspect 1. A method for wireless communications at a UE, comprising: detecting one or more sidelink messages on an unlicensed channel, the one or more sidelink messages sharing a common sidelink feedback symbol; mapping a first set of sidelink feedback resources for a first interlace of one or more interlaces for each sidelink feedback associated with the one or more sidelink messages according to an interlace mapping rule associated with sidelink feedback resources of the common sidelink feedback symbol; determining whether to allocate a second set of sidelink feedback resources for a second interlace of the one or more interlaces for sidelink feedback associated with a first sidelink message of the one or more sidelink messages based at least in part on whether the second interlace overlaps with an additional first interlace of the one or more interlaces for the sidelink feedback associated with a second sidelink message of the one or more sidelink messages, wherein the second interlace is a replica of the first interlace associated with the first sidelink message, and wherein the first sidelink message is addressed to the UE; and transmit, during the sidelink feedback symbol, sidelink feedback associated with the first sidelink message via the first interlace according to the mapping and based at least in part on the determining.

Aspect 2. The method of aspect 1, further comprising: transmitting, during the sidelink feedback symbol, the sidelink feedback associated with the first sidelink message via the replica of the first interlace based at least in part on the determining, wherein the replica of the first interlace for the sidelink feedback associated with the first sidelink message is not overlapping with the additional first interlace for the sidelink feedback associated with the second sidelink message.

Aspect 3. The method of aspect 2, further comprising: mapping the replica of the first interlace for the sidelink feedback associated with the first sidelink message to a second set of sidelink feedback resources of the sidelink feedback symbol according to a replica mapping rule, wherein the determining is based at least in part on the mapping.

Aspect 4. The method of aspect 3, wherein the replica mapping rule comprises an offset value indicating a quantity of frequency resources of the sidelink feedback symbol between the first set of sidelink feedback resources and the second set of sidelink feedback resources of the sidelink feedback symbol.

Aspect 5. The method of aspects 2 through 4, wherein the first interlace and the replica of the first interlace for the sidelink feedback associated with the first sidelink message satisfy a channel occupancy threshold for the sidelink feedback symbol on the unlicensed channel.

Aspect 6. The method of aspect 1, further comprising: refraining from transmitting the replica of the first interlace for the sidelink feedback associated with the first sidelink message via the second set of sidelink feedback resources of the sidelink feedback symbol based at least in part on the determining, wherein the second set of sidelink feedback resources of the sidelink feedback symbol is occupied by the additional first interlace for the sidelink feedback associated with the second sidelink message.

Aspect 7. The method of aspect 6, wherein the sidelink feedback satisfies a channel occupancy threshold for the sidelink feedback symbol on the unlicensed channel.

Aspect 8. The method of aspects 1 through 7, further comprising: receiving configuration information comprising parameters for at least the interlace mapping rule, a replica mapping rule, or both, wherein the mapping is based at least in part on the parameters.

Aspect 9. The method of aspects 1 through 8, further comprising: monitoring the unlicensed channel for the one or more sidelink messages, wherein the detecting is based at least in part on the monitoring, and wherein at least one of the one or more sidelink messages are addressed to one or more additional UEs.

Aspect 10. The method of aspects 1 through 9, wherein the mapping is based at least in part on the interlace mapping rule and a cast type of the first sidelink message.

Aspect 11. The method of aspect 10, wherein transmitting the sidelink feedback comprises: transmitting a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a unicast cast type addressed to the UE.

Aspect 12. The method of aspect 10, wherein transmitting the sidelink feedback comprises: transmitting a sidelink feedback message associated with the first sidelink message via a first set of a plurality of physical resource blocks for the first interlace for sidelink feedback, the sidelink feedback message comprising a negative acknowledgement message indicating that the UE failed to decode the first sidelink message, wherein the first sidelink message comprises a multicast cast type addressed to a plurality of UEs comprising the UE, and wherein the first set of the plurality of physical resource block is allocated to the plurality of UEs, according to the interlace mapping rule, for transmitting the sidelink feedback.

Aspect 13. The method of aspect 10, wherein transmitting the sidelink feedback comprises: transmitting a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a multicast cast type addressed to a plurality of UEs comprising the UE, and wherein the first set of the plurality of physical resource blocks of the first interlace is allocated to each UE of the plurality of UEs, according to the interlace mapping rule, for transmitting the sidelink feedback.

Aspect 14. The method of aspects 1 through 13, wherein the first interlace for sidelink feedback comprises a plurality of physical resource blocks that are contiguous in frequency.

Aspect 15. The method of aspects 1 through 13, wherein the first interlace for sidelink feedback comprises a plurality of physical resource blocks that are not contiguous in frequency.

Aspect 16. The method of aspects 1 through 13, wherein the first interlace for sidelink feedback comprises a plurality of respective physical resource blocks that are associated with a single cyclic shift.

Aspect 17. The method of aspects 1 through 13, wherein the first interlace for sidelink feedback comprises a plurality of respective physical resource blocks that are associated with a plurality of cyclic shifts.

Aspect 18. A method for wireless communications at a UE, comprising: transmitting one or more sidelink messages on an unlicensed channel, the one or more sidelink messages sharing a common sidelink feedback symbol; mapping a first set of sidelink feedback resources for a first interlace of one or more interlaces for each sidelink feedback associated with the one or more sidelink messages according to an interlace mapping rule associated with sidelink feedback resources of the common sidelink feedback symbol; and receiving, during the sidelink feedback symbol, a sidelink feedback associated with a first sidelink message of the one or more sidelink messages via the first interlace according to the mapping.

Aspect 19. The method of aspect 18, further comprising: receiving configuration information comprising parameters for at least the interlace mapping rule, a replica mapping rule, or both, wherein the mapping is based at least in part on the parameters.

Aspect 20. The method of aspects 18 through 19, further comprising: mapping the first set of sidelink feedback resources for the first interlace for each sidelink feedback associated with the one or more sidelink messages based at least in part on the interlace mapping rule and a cast type of the first sidelink message; and monitoring the first interlace for each sidelink feedback associated with the one or more sidelink messages based at least in part on the mapping, wherein receiving the sidelink feedback associated with the first sidelink message is based at least in part on the monitoring.

Aspect 21. The method of aspect 20, wherein receiving the sidelink feedback comprises: receiving a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a unicast cast type.

Aspect 22. The method of aspect 20, wherein receiving the sidelink feedback comprises: receiving at least one sidelink feedback message associated with the first sidelink message via a first set of a plurality of physical resource blocks for the first interlace for sidelink feedback, the sidelink feedback message comprising a negative acknowledgement message indicating that at least one of a plurality of UEs failed to decode the first sidelink message, wherein the first sidelink message comprises a multicast cast type addressed to the plurality of UEs, and wherein the first set of the physical resource block is allocated to the plurality of UEs, according to the interlace mapping rule, for transmitting the sidelink feedback.

Aspect 23. The method of aspect 20, wherein receiving the sidelink feedback comprises: receiving a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a multicast cast type addressed to a plurality of UEs, and wherein the first set of the plurality of physical resource blocks are allocated to a respective UE of the plurality of UEs, according to the interlace mapping rule, for transmitting the sidelink feedback.

Aspect 24. The method of aspects 18 through 23, wherein the first interlace for sidelink feedback comprises a plurality of physical resource blocks that are contiguous in frequency.

Aspect 25. The method of aspects 18 through 23, wherein the first interlace for sidelink feedback comprises a plurality of physical resource blocks that are not contiguous in frequency.

Aspect 26. The method of aspects 18 through 23, wherein the first interlace for sidelink feedback comprises a plurality of respective physical resource blocks that are associated with a single cyclic shift.

Aspect 27. The method of aspects 18 through 23, wherein the first interlace for sidelink feedback comprises a plurality of respective physical resource blocks that are associated with a plurality of cyclic shifts.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    one or more processors;
    one or more memories coupled with the one or more processors; and
    instructions stored in the one or more memories and executable by the one or more processors to cause the apparatus to:
        detect a first sidelink message on an unlicensed channel, the first sidelink message sharing a common sidelink feedback symbol;
        map a first set of sidelink feedback resources for a first interlace of one or more interlaces for each sidelink feedback associated with the first sidelink message according to an interlace mapping rule associated with sidelink feedback resources of the common sidelink feedback symbol;
        determine whether to allocate a second set of sidelink feedback resources for a second interlace of the one or more interlaces for sidelink feedback associated with the first sidelink message, wherein the second interlace is a replica of the first interlace associated with the first sidelink message, and wherein the first sidelink message is addressed to the UE;
        map the replica of the first interlace for the sidelink feedback associated with the first sidelink message to a second set of sidelink feedback resources of the common sidelink feedback symbol according to a replica mapping rule;
        transmit, during the common sidelink feedback symbol, sidelink feedback associated with the first sidelink message via the first interlace; and
        transmit, during the common sidelink feedback symbol, the sidelink feedback associated with the first sidelink message via the replica of the first interlace based at least in part on the determining.

2. The apparatus of claim 1, wherein the replica mapping rule comprises an offset value indicating a quantity of frequency resources of the common sidelink feedback symbol between the first set of sidelink feedback resources and the second set of sidelink feedback resources of the common sidelink feedback symbol.

3. The apparatus of claim 1, wherein the first interlace and the replica of the first interlace for the sidelink feedback associated with the first sidelink message satisfy a channel occupancy threshold for the common sidelink feedback symbol on the unlicensed channel.

4. The apparatus of claim 1, wherein the instructions are further executable by the one or more processors to cause the apparatus to:
    refrain from transmitting the replica of the first interlace for the sidelink feedback associated with the first sidelink message via the second set of sidelink feedback resources of the common sidelink feedback symbol based at least in part on the determining, wherein the second set of sidelink feedback resources of the common sidelink feedback symbol is occupied by the additional first interlace for the sidelink feedback associated with the second sidelink message.

5. The apparatus of claim 4, wherein the sidelink feedback satisfies a channel occupancy threshold for the common sidelink feedback symbol on the unlicensed channel.

6. The apparatus of claim 1, wherein the instructions are further executable by the one or more processors to cause the apparatus to:
    receive configuration information comprising parameters for at least the interlace mapping rule, a replica mapping rule, or both, wherein the mapping is based at least in part on the parameters.

7. The apparatus of claim 1, wherein the instructions are further executable by the one or more processors to cause the apparatus to:
    monitor the unlicensed channel for the first sidelink message and the second sidelink message, wherein the detecting is based at least in part on the monitoring, and wherein at least one of the first sidelink message and the second sidelink message are addressed to one or more additional UEs.

8. The apparatus of claim 1, wherein the mapping is based at least in part on the interlace mapping rule and a cast type of the first sidelink message.

9. The apparatus of claim 8, wherein the instructions to transmit the sidelink feedback are executable by the one or more processors to cause the apparatus to:
transmit a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a unicast cast type addressed to the UE.

10. The apparatus of claim 8, wherein the instructions to transmit the sidelink feedback are executable by the one or more processors to cause the apparatus to:
transmit a sidelink feedback message associated with the first sidelink message via a first set of a plurality of physical resource blocks for the first interlace for sidelink feedback, the sidelink feedback message comprising a negative acknowledgement message indicating that the UE failed to decode the first sidelink message, wherein the first sidelink message comprises a multicast cast type addressed to a plurality of UEs comprising the UE, and wherein the first set of the plurality of physical resource block is allocated to the plurality of UEs, according to the interlace mapping rule, for transmitting the sidelink feedback.

11. The apparatus of claim 8, wherein the instructions to transmit the sidelink feedback are executable by the one or more processors to cause the apparatus to:
transmit a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a multicast cast type addressed to a plurality of UEs comprising the UE, and wherein the first set of the plurality of physical resource blocks of the first interlace is allocated to each UE of the plurality of UEs, according to the interlace mapping rule, for transmitting the sidelink feedback.

12. The apparatus of claim 1, wherein the first interlace for sidelink feedback comprises a plurality of physical resource blocks that are contiguous in frequency.

13. The apparatus of claim 1, wherein the first interlace for sidelink feedback comprises a plurality of physical resource blocks that are not contiguous in frequency.

14. The apparatus of claim 1, wherein the first interlace for sidelink feedback comprises a plurality of respective physical resource blocks that are associated with a single cyclic shift.

15. The apparatus of claim 1, wherein the first interlace for sidelink feedback comprises a plurality of respective physical resource blocks that are associated with a plurality of cyclic shifts.

16. A method for wireless communications at a user equipment (UE), comprising:
detecting a first sidelink message on an unlicensed channel, the first sidelink message sharing a common sidelink feedback symbol;
mapping a first set of sidelink feedback resources for a first interlace of one or more interlaces for each sidelink feedback associated with the first sidelink message according to an interlace mapping rule associated with sidelink feedback resources of the common sidelink feedback symbol;
determining whether to allocate a second set of sidelink feedback resources for a second interlace of the one or more interlaces for sidelink feedback associated with the first sidelink message, wherein the second interlace is a replica of the first interlace associated with the first sidelink message;
mapping the replica of the first interlace for the sidelink feedback associated with the first sidelink message to a second set of sidelink feedback resources of the common sidelink feedback symbol according to a replica mapping rule;
transmitting, during the common sidelink feedback symbol, sidelink feedback associated with the first sidelink message via the first interlace; and
transmitting, during the common sidelink feedback symbol, the sidelink feedback associated with the first sidelink message via the replica of the first interlace based at least in part on the determining.

17. The method of claim 16, wherein the replica mapping rule comprises an offset value indicating a quantity of frequency resources of the common sidelink feedback symbol between the first set of sidelink feedback resources and the second set of sidelink feedback resources of the common sidelink feedback symbol.

18. The method of claim 16, wherein the first interlace and the replica of the first interlace for the sidelink feedback associated with the first sidelink message satisfy a channel occupancy threshold for the common sidelink feedback symbol on the unlicensed channel.

19. The method of claim 16, further comprising:
refraining from transmitting the replica of the first interlace for the sidelink feedback associated with the first sidelink message via the second set of sidelink feedback resources of the common sidelink feedback symbol based at least in part on the determining, wherein the second set of sidelink feedback resources of the common sidelink feedback symbol is occupied by the additional first interlace for the sidelink feedback associated with the second sidelink message.

20. The method of claim 19, wherein the sidelink feedback satisfies a channel occupancy threshold for the common sidelink feedback symbol on the unlicensed channel.

21. The method of claim 16, further comprising:
receiving configuration information comprising parameters for at least the interlace mapping rule, a replica mapping rule, or both, wherein the mapping is based at least in part on the parameters.

22. The method of claim 16, further comprising:
monitoring the unlicensed channel for the first sidelink message and the second sidelink message, wherein the detecting is based at least in part on the monitoring, and wherein at least one of the first sidelink message and the second sidelink message are addressed to one or more additional UEs.

23. The method of claim 16, wherein the mapping is based at least in part on the interlace mapping rule and a cast type of the first sidelink message.

24. The method of claim 23, further comprising:
transmitting a sidelink feedback message associated with the first sidelink message via a first set of a plurality of physical resource blocks for the first interlace for sidelink feedback, the sidelink feedback message comprising an acknowledgement message or a negative acknowledgement message, wherein the first sidelink message comprises a unicast cast type addressed to the UE.

25. A non-transitory computer-readable medium storing code for wireless communications, the code comprising instructions executable by one or more processors to:

- detect a first sidelink message on an unlicensed channel, the first sidelink message sharing a common sidelink feedback symbol;
- map a first set of sidelink feedback resources for a first interlace of one or more interlaces for each sidelink feedback associated with the first sidelink message according to an interlace mapping rule associated with sidelink feedback resources of the common sidelink feedback symbol;
- determine whether to allocate a second set of sidelink feedback resources for a second interlace of the one or more interlaces for sidelink feedback associated with the first sidelink message, wherein the second interlace is a replica of the first interlace associated with the first sidelink message, and wherein the first sidelink message is addressed to a UE;
- map the replica of the first interlace for the sidelink feedback associated with the first sidelink message to a second set of sidelink feedback resources of the common sidelink feedback symbol according to a replica mapping rule;
- transmit, during the common sidelink feedback symbol, sidelink feedback associated with the first sidelink message via the first interlace; and
- transmit, during the common sidelink feedback symbol, the sidelink feedback associated with the first sidelink message via the replica of the first interlace based at least in part on the determining.

26. An apparatus for wireless communications, comprising:

- means for detecting a first sidelink message on an unlicensed channel, the first sidelink message sharing a common sidelink feedback symbol;
- means for mapping a first set of sidelink feedback resources for a first interlace of one or more interlaces for each sidelink feedback associated with the first sidelink message according to an interlace mapping rule associated with sidelink feedback resources of the common sidelink feedback symbol;
- means for determining whether to allocate a second set of sidelink feedback resources for a second interlace of the one or more interlaces for sidelink feedback associated with the first sidelink message of the one or more sidelink messages based at least in part on whether the second interlace overlaps with an additional first interlace for the sidelink feedback associated with a second sidelink message, wherein the second interlace is a replica of the first interlace associated with the first sidelink message;
- means for mapping the replica of the first interlace for the sidelink feedback associated with the first sidelink message to a second set of sidelink feedback resources of the common sidelink feedback symbol according to a replica mapping rule;
- means for transmitting, during the common sidelink feedback symbol, sidelink feedback associated with the first sidelink message via the first interlace; and
- means for transmitting, during the common sidelink feedback symbol, the sidelink feedback associated with the first sidelink message via the replica of the first interlace based at least in part on the determining.

* * * * *